United States Patent
Vargas

(10) Patent No.: US 9,086,931 B2
(45) Date of Patent: *Jul. 21, 2015

(54) SYSTEM FOR TRANSLATING DIVERSE PROGRAMMING LANGUAGES

(71) Applicant: Byron D. Vargas, Brooklyn, NY (US)

(72) Inventor: Byron D. Vargas, Brooklyn, NY (US)

(73) Assignee: PureNative Software Corporation, Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/173,316

(22) Filed: Feb. 5, 2014

(65) Prior Publication Data

US 2014/0157243 A1    Jun. 5, 2014

Related U.S. Application Data

(63) Continuation-in-part of application No. 13/680,932, filed on Nov. 19, 2012, now Pat. No. 8,656,372, which is a continuation-in-part of application No. 12/031,279, filed on Feb. 14, 2008, now Pat. No. 8,332,828, which is a continuation-in-part of application No. 10/716,099, filed on Nov. 17, 2003, now Pat. No. 7,346,897.

(60) Provisional application No. 60/427,733, filed on Nov. 20, 2002.

(51) Int. Cl.
*G06F 9/45* (2006.01)
(52) U.S. Cl.
CPC .......................................... *G06F 8/51* (2013.01)
(58) Field of Classification Search
CPC .......................................................... G06F 8/51

USPC .................................. 717/136–139, 108, 116
See application file for complete search history.

(56) References Cited

U.S. PATENT DOCUMENTS

| | | | |
|---|---|---|---|
| 5,307,499 | A | 4/1994 | Yin |
| 5,768,564 | A | 6/1998 | Andrews et al. |
| 5,875,331 | A | 2/1999 | Lindsey |
| 6,031,993 | A | 2/2000 | Andrews et al. |

(Continued)

FOREIGN PATENT DOCUMENTS

WO    02093371 A1    11/2002

OTHER PUBLICATIONS

Schwab, Lukas S., "ObjectiveSharp: automatic conversion of apps from the iPhone to the Windows Phone", 2011, retrieved from http://e-collection.library.ethz.ch/view/eth:3034 , Eidgenossische Technische Hochschule Zurich, 80 pages.*

(Continued)

*Primary Examiner* — Ted T Vo
(74) *Attorney, Agent, or Firm* — St. Onge Steward Johnston & Reens LLC

(57) ABSTRACT

A computer language translator that translates all or any portion thereof of source code in an original computer language to source code in a target computer language, which may then be translated back to the original language while still maintaining concept, syntax, form of expression, and formatting of the original source code. The translator may take the form of a tool that resides on a server such that the user may select file of source code corresponding to desired functionality and the user may indicate which computer language the file should provided in. The tool will then translate the selected file to the desired computer language.

23 Claims, 16 Drawing Sheets

(56) References Cited

U.S. PATENT DOCUMENTS

| | | | |
|---|---|---|---|
| 6,142,684 | A | 11/2000 | Kirshenbaum et al. |
| 6,314,429 | B1 | 11/2001 | Simser |
| 6,317,871 | B1 | 11/2001 | Andrews et al. |
| 6,523,171 | B1 | 2/2003 | Dupuy et al. |
| 6,698,014 | B1 | 2/2004 | Rechter |
| 6,728,950 | B2 | 4/2004 | Davis et al. |
| 6,901,588 | B1 | 5/2005 | Krapf et al. |
| 6,986,101 | B2 | 1/2006 | Cooper et al. |
| 6,993,751 | B2 | 1/2006 | Bhansali et al. |
| 7,047,524 | B1 | 5/2006 | Braddock, Jr. |
| 7,346,897 | B2 * | 3/2008 | Vargas .......................... 717/137 |
| 7,353,502 | B2 | 4/2008 | Stewart et al. |
| 7,406,681 | B1 | 7/2008 | Hinker |
| 7,770,158 | B2 | 8/2010 | Osborne et al. |
| 8,332,828 | B2 * | 12/2012 | Vargas .......................... 717/137 |
| 8,621,442 | B2 * | 12/2013 | Ben-Artzi et al. ............ 717/136 |
| 8,656,372 | B2 * | 2/2014 | Vargas .......................... 717/137 |
| 2003/0078902 | A1 | 4/2003 | Leong et al. |
| 2003/0126559 | A1 | 7/2003 | Fuhrmann |

OTHER PUBLICATIONS

Terekhov, Andrey A; Automating Language Conversion: A Case Study, St. Petersburg State University, 2001.

Gutierrez, Jesus; J.D. Edwards; C to Java Transformations Jun. 15, 2001.

Demaine, Erik D.; C to Java: Converting Pointers into References; University of Waterloo; Feb. 28, 1998.

Coplien, James O.; Curiously recurring template patterns; C++ Report; Feb. 1995, pp. 24-27.

CXXWRAP Documentation; www.deaven.net, Jun. 1, 2000.

Nilsson, Anders; Ekman, Torbjorn; Deterministic Jana in Tiny Embedded Systems; Lund University, Sweden, 2001.

From Java to C++; www.cs.buffalo.edu, Jan. 19, 2000.

Reyelts, Toby; Integrate Java and C++ with Jace; www.javaworld.com; May 10, 2002.

Haruhiko, Iida; Java to C++ source code converter without GC, tread and . . . ; 1997.

Greg J. Badros; "JavaML: a markup Language for Java Source Code"; 2000; 15 pages.

Shaylor, Nik; JCC—A Java to C converter; Version 0.02; May 8, 1997.

JFE Cross Compiler and Dinkum Jcore Library, Edison Design Group and Dinkumware, Ltd., 1996-2003.

Masters Research; www.cs.queensu.ca, Nov. 14, 2003.

PL/SQL in2j (for Oracle); www.in2j.com, 2002.

Zeichick, Alan; Quintessence Coverts PL/SQL to Java; Software Development Times; May 15, 2002.

Rogue Wave(R) Bobcat; Rogue Wave Software, Inc. (C) 2002.

Scalable Visualization Toolkit; www.vistools.npaci.edu; National Partnership for Advanced Computation; (C) 2000-2003.

Kunchithapadam, Krishna; Translating Java to C++; cs.wisc.edu; Dec. 18, 1996.

XML—Enabling SourcePro DB Applications with SourcePro Net; Rogue Wave Software; (2-SPDBN-WP 03/02), May 16, 2003.

* cited by examiner

SYSTEM FOR TRANSLATING DIVERSE PROGRAMMING LANGUAGES

FIELD OF THE INVENTION

The present invention relates to a system and method for translating source code between different computer languages and different operating environments. More specifically, the present invention relates to a bi-directional computer language translator where source code written in an original language may be translated to a target language, and then may be translated back to the original language while still maintaining concept, syntax, form of expression, and formatting of the original source code.

BACKGROUND OF THE INVENTION

Computer systems and applications have reached almost every market on a global scale. As a result, vast sums of money are spent in researching and developing new applications and programs. Typically, these applications are written in a computer language selected by a software developer or by a group of software developers.

A trend among software developers has been toward use of object-oriented programming ("OOP") languages. Three major categories of OOP languages are (1) systems programming languages, which are generally unmanaged and natively compiled and, in turn, executed natively; (2) productivity-oriented business application programming languages, which are generally managed and compiled to non-native bytecodes or a non-native intermediate language ("IL") and, in turn, executed non-natively by a managed runtime environment or virtual machine; and (3) scripting languages, which are generally managed and expressed in plain text source code instead of a binary form like compiled languages, and, in turn, plain text source code is executed non-natively by a scripting runtime environment or virtual machine.

Scripting languages are relatively easy-to-program computer languages that use simpler and more permissive forms of expression than compiled languages, such as Java and C++. Scripting language programs are usually expressed in plain text as source code instead of a binary form like compiled programs, which makes them very readable and easy to modify. They are generally interpreted instead of being explicitly compiled by the programmer. This means that programmers see immediate results from their programming statements and makes for a very interactive development experience. These features make scripting languages well suited for beginners, experimentation and research, system administrative tasks, and high-productivity, fast-turn-around development projects. Scripting languages are becoming dominant in Web programming, both for Web server and Web client programming. Scripting languages are also used in, for example, Adobe Flash, integrated runtime environments from Adobe, Microsoft, and Sun, desktop operating environments like Mac OS X, as well as mobile devices, such as for example, but not limited to, the iPhone® that runs iOS, and the various Android devices that run Android OS. The mobile devices would also include tablet devices, such as for example, but not limited to, the iPad® that runs iOS, or the Google Nexus® and Samsung Galaxy® that run Google's Android OS. For these reasons, scripting languages are very popular with programmers and the range of devices that supports them continues to grow.

Systems programming languages are typically used for developing performance critical applications, operating systems, operating environments, operating system specific applications, managed runtime environments and virtual machines, embedded systems, and hardware specific software, such as for instance, device drivers. Systems programming languages are generally lower-level languages which offer finer control over the run-time execution of applications. Systems programming languages include, for instance but are not limited to C and C++.

Productivity-oriented business application languages are typically used for developing applications for electronic commerce, wireless devices, multimedia devices and platforms, accessing databases, web applications, and other business-related needs. Productivity-oriented business application languages are generally higher-level languages which offer greater programmer productivity and increased reliability during the run-time execution of applications. Business application languages include, for instance but are not limited to Java® and C# (pronounced, "C-Sharp"). These however, are just a few of the many OOP languages that may be utilized in generating applications.

Traditionally, software developers choose one computer language for systems programming and another for business applications programming. In doing so, however, they must make sacrifices and accept the tradeoffs of the selected language. The application, design methodology, and business model may all factor into the choice of programming language used for a particular application.

For instance, C++ is typically viewed as an advantageous language for creating large-scale applications, whereas Java is typically viewed as optimized for the distribution of program objects in a network such as the Internet. Java is generally considered a higher level language than C++, that is, closer to the actual business application. As a result, many programmers prefer to write programs in Java because it is generally considered an easier language to use than C++.

Another advantage Java provides is that Java objects cannot contain references to data external to themselves or other known objects. This ensures that an instruction input by a programmer cannot contain an address of data storage in another application or in the operating system itself, either of which could cause the program and possibly even the operating system to terminate or crash. In addition, Java utilizes a virtual machine that makes a number of checks on each object to ensure integrity. This results in a finished application that is not prone to low-level memory errors and requires considerably less debugging. C++ on the other hand does not have these safety functions such that a programmer may inadvertently or maliciously cause problems with the operating system. In addition, many of the computer viruses seen today exploit this characteristic of C++ to cause widespread computer problems. Many of these problems could be avoided by utilizing Java because of the built-in safety checks and balances inherent to the language.

Alternatively, there are some distinct advantages associated with C++ as opposed to Java. For instance, C++ is generally considered a higher performance language than Java. Once an application is written in C++, it may be compiled to native code or machine code, as opposed to Java, which is typically compiled into bytecode. As a result, unlike Java, a program compiled into native code does not need to operate with a virtual machine, which results in increased application performance. Another advantage to compiling a program to native code is that it is very difficult to derive the C++ source code from the native code, whereas it is a fairly simple matter to derive the Java source code from the compiled bytecode. Therefore, C++ can provide greater protection for a company's intellectual property.

In view of the forgoing, there is an inherent tension between using Java and using C++. Many programmers would prefer to write programs in Java, however many companies want their end product to be completed in C++ so that it may be compiled into native code. However, companies also recognize the benefits of using Java, realizing that it may be a faster and less expensive way to get new products and services to market. This is because Java is generally considered an easier language to use and also because of the greatly reduced debugging time associated with new applications.

Historically it has been very difficult or nearly impossible to convert a program written in C++ to Java and/or vice versa. To do so requires manual porting, which is generally labor intensive, error prone, and requires extensive re-testing.

To address these issues and minimize the differences between computer languages, a number of existing systems have tried a number of approaches. These include for instance: (1) cross-language interoperability layers and object mapping mechanisms; (2) native compilers for traditionally non-natively compiled languages; (3) programs which convert or migrate computer programs from one language to another language; and (4) programs which translate computer programs between different computer languages. None of these approaches, however, have provided an acceptable solution.

For instance, one approach taken is cross-language interoperability layers and object mapping mechanisms including the Sun Microsystems® Java Native Interface™ (JNI), the Microsoft® Common Object Model™ (COM), and the Object Management Group® (OMG) Common Object Request Broker Architecture™ (CORBA). Such solutions are generally suited for integrating two or more different computer languages and operating environments. However, they do not eliminate the need for middleware, such as virtual machines, managed runtime environments, and object request brokers (ORBs), but instead increase dependence on these. This dependence make these solutions unsuitable for demanding low-level systems programming for developing for instance, operating systems, virtual machines, and embedded systems.

A second approach taken includes native compilers for traditionally non-natively compiled languages including, for instance, the GNU® Compiler for Java (GCJ) and the Excelsior JET. The GNU Compiler for Java (GCJ) is a free (open source) software project and is disclosed in U.S. Pat. No. 6,110,226. These products compile Java source code or Java bytecode, a platform-independent intermediate language, to native binary executables. The GCJ compiler may generate native binary executables, which do not require a virtual machine to execute program, so long as the compiled Java program does not make use of Java classes or objects, which are externally referenced or otherwise not natively compiled. In the latter case, the compiled native binary executable requires an internal (statically-linked) or external (dynamically-linked) virtual machine, which suffers from the same drawbacks as cross-language interoperability layers and object mapping mechanisms. Alternatively, Excelsior JET for instance, generates native binary executables that generally depend on the presence of a virtual machine on the client system in order to run. However, these requirements carry the same drawbacks as common cross-language interoperability layers and therefore negate most of the benefits of native compilers.

While the GCJ compiler does support interoperability with C++ through CNI (Cygnus® Native Interface), this means of interoperability however, is effectively limited to the GNU C++ compiler. GCJ does not support interoperability with leading platform-specific C++ compilers, such as Microsoft Visual C++® for Microsoft Windows® operating system, nor does it support the industry-standard JNI to interoperate with leading Java virtual machines. Additionally, native compilers do not translate source code to another computer language, so they do not inherently benefit from wealth of available software development tools, such as compilers, linkers, optimizers, and debuggers, or features of other popular computer languages, such as C++.

A third approach has been to convert or migrate source code in one computer language to another computer language. This approach is disclosed in U.S. Pat. No. 6,453,464 ("the '464 patent"). This approach is directed toward migrating source code from an aging computer language, such as for instance COBOL, to an OOP language, such as Java. However, the resulting translated source code does not fully preserve the style and spirit of the original source code, is not easily human-readable, and does not support translation back to the original language. Therefore, the system disclosed in the '464 patent cannot be used for bi-directional translation between OOP languages to combine the best features of both languages.

A fourth approach taken has included computer language-to-computer language translation. Existing translators include Toba, C2J, and J2C, among others. These solutions, however, have severe limitations of their respective design and implementation. For instance, they fail to: manage objects exactly like the original language, manage arrays exactly like the original language, maintain the same high-level of thread safety characteristic in the original language, and support the full breadth of features of the original language. Additionally, none of these approaches support nor addresses bi-directional translation. Still further, these one-way translation approaches generally require translation of the entire application at one time, rather than providing for translation of only a file or a portion of a file.

Most modern scripting languages support Object-Oriented Programming (OOP) features. Such object-oriented scripting languages include, but are not limited to, JavaScript, Ruby, Python, Perl and PHP. Object-oriented programming features make such scripting languages easier to understand and their programs more maintainable. Further, to assist programmers, modern object-oriented programming languages have their own language-specific API class library.

However, not all the world's programmers are proficient in scripting languages and not all the world's devices support, or efficiently support, scripting languages. For example, a developer proficient in C++ or Java may prefer to run an existing C++ or Java program in a scripting environment. To do so, the developer would need to become proficient in the target scripting language and its associated API class library and would need to manually rewrite the existing C++ or Java program in the target scripting language. As another example, a developer proficient in a certain scripting language, such as JavaScript, Python, Ruby, Perl or PHP, would need to rewrite the program in C++ in order to run on an embedded or mobile device that did not support scripting languages.

Further, not all scripting languages are supported on all devices that support scripting. For example, Web browsers generally only support JavaScript and not Ruby, Python, Perl or PHP. Still further, a developer may need to produce a program that runs at peak efficiency on a device. Even though the device supports scripting languages, in order to perform at maximum speed and efficiency, the program must instead use a compiled programming language, such as C++. In this example, the developer would need to be proficient in C++ and either create or rewrite the program in C++ in order to meet the project requirements.

Further, there is a vast amount of source code, especially open source programs, readily or freely available on the Internet and through various other forms of distribution, such as CD-ROM and DVD-ROM. However, usually an individual program is only available for one particular computer language or perhaps a few computer languages. It is common for software developers to come across source code, especially by searching the Internet or by examining public source code repositories, which meet their needs except that the source code they have found is in a different computer language than their project requires. Such developers are faced with either manually porting the source code to their target computer language or limit their search results to only source code in their target computer language, neither option being desirable.

Further, for various business and technical reasons, certain devices will lack support for a particular scripting language and scripting runtime environment. The ability to add support for a particular scripting language and scripting runtime environment would be a desirable feature for consumers and vendors alike, especially if the feature could be provided entirely in software without requiring any hardware modifications. For example, the lack of support for Adobe Flash and its associated scripting language ActionScript on the iPhone has been a cause for complaint on the part of present and prospective iPhone user alike. At present, the wide range of Adobe Flash and ActionScript language programs are not available to iPhone users.

Further, the inherent nature of scripting language programs being expressed in plain text source code is highly undesirable for certain applications and certain organizations. In order to safeguard intellectual property, preserve trade secrets, and prevent tampering, especially related to computer security, online crime, and circumventing protection schemes for digital media, it would be essential that certain applications only be distributed in compiled binary form. This would either preclude scripting languages for such applications, or it would necessitate manually porting existing scripting language programs to a compiled language before being externally distributed.

For these reasons, it is desirable for an invention to automatically translate source code from an object-oriented scripting language to a compiled object-oriented programming language.

In line with this, it is further desirable to seamlessly and automatically translate a program at runtime, such as during the process of downloading and starting the program, from a foreign, or unsupported, object-oriented scripting language to a scripting language for which the host device includes built-in support.

Further, it is desirable for an invention to automatically translate source code from a compiled object-oriented programming language to an object-oriented scripting language.

Still further, is desirable for an invention to automatically translate source code from an object-oriented scripting language to another object-oriented scripting language.

It is further desired to provide a computer language translation system that may be coupled with associated software libraries and accurately and reliably translate source codes between higher-level productivity-oriented business application programming languages and systems programming languages.

It is still further desired to provide a bi-directional computer language translation system that may accurately and reliably translate source code from a higher-level productivity-oriented business application programming language to a systems programming language and back again.

It is yet further desired to provide a computer language translation system that is usable with multiple computing platforms, operating systems, and operating environments.

It is also desired to provide a computer language translation system that provides deterministic automated object management without a garbage collector in order to be suitable for embedded systems.

It is still further desired to provide a computer language translation system that may utilize industry-standard compiler tools, such as for instance, ANSI® C++ compilers.

It is yet further desired to provide a computer language translation system that will be virtual machine agnostic, specifically, that will be able to operate without a virtual machine, or conversely, if desired, able to interoperate with an industry standard virtual machine.

It is still further desired to provide a computer language translation system that adheres to industry standards for cross-language interoperability, such as JNI for interoperability between Java environments and C++ environments.

It is also desired to provide a computer language translation system that can be utilized by an Internet or Intranet search engine in order to automatically translate search results comprising source code from the original computer language of the found source code to the preferred computer language of the user requesting the search.

It is also desired to provide a computer language translation system that can be utilized by the search indexing engine of an Internet or Intranet search engine. As the search indexing engine comes across source code, the search indexing engine can use the invention to automatically translate source code from the original computer language of the source code to a multiplicity of computer languages, and then index the source code in its original computer language as well as a multiplicity of computer languages. This would allow the search engine to find more code sample in diverse computer languages regardless of the computer language of the search query itself.

It is yet further desired to provide a computer language translation system that may be utilized to translate only a portion of the source code to be translated.

SUMMARY OF THE INVENTION

Accordingly, a bi-directional translator has been provided that translates source code from one computer language to another divergent computer language. The translated source code closely resembles the original program source code in: concept, syntax, form of expression, and formatting. The system may be utilized as either an automatic translator that automatically translates source code from one computer language to another, or may be utilized in connection with a software development library that enables programs to be manually ported from one computer language to another.

When the system is utilized to automatically translate, a software tool is provided that automatically translates programs written in for instance, the Java language to the C++ language, the Objective-C language, the Smalltalk language, or from or to a scripting language, such as JavaScript, Python, Ruby or Perl. The tool makes use of tables and specific language knowledge of Java and C++ or the scripting language. This tool does not require clean-up or hand editing after translation. The final translated programs may be built and run as is.

Alternatively, if the system is used by a programmer who is manually porting the source code, a software development library that implements the Java language and core APIs in ANSI standard C++ syntax is provided. Manually ported C++ programs, which make use of the library, closely resemble the original programs in the Java language.

Because of the nature of divergent OOP languages, such as Java and C++ or scripting languages, the divergent languages are incompatible, meaning that one word does not simply translate straight to another word. For instance, the way variables are identified in Java is different than in C++. To achieve bi-directional translation, the system, in resolving incompatibilities performs a name adjustment that is consistently utilized throughout. Because the name adjustments are always consistent, the system may re-translate either the entire document or only small sections as desired.

The system also utilizes tagged elements or tags, which are inserted by the system to control how for instance; a specific section of source code is translated. The tagged element may include a Java instruction inserted into the C++ translation. In this manner, if the Java source code instruction is incompatible with any C++ source code instruction, the original is not lost, but instead is maintained in a tagged element within the C++ source code. This feature facilitates bi-directional translation because the original language may be exactly re-created from the translation, even with incompatibility problems.

It is understood that the software that executes the translation of OOP language(s) may reside on a computer operated by a user (a programmer). However, it should be understood that the translation software may reside on a web server in the "cloud." A user may visit a location on the Internet to obtain open source code (e.g., sites such as GitHub.com and the like). However, the source code may be provided in a first programming language that the user does not want to utilize. In this case, it is contemplated that a translation tool may be provided in the cloud allowing the user to translate the software from the first programming language to a desired second programming language.

In one embodiment, the translation tool could be positioned on a server accessible by a web page such that the user can upload the source code in the first programming language to the web page, then select the desired second programming language the user desires the source code to be translated to. When completed, the translation tool could alert the user that the translation process is completed. The source code in the desired second programming language could be pushed out to the user (e.g., emailed to an email address provided by the user as an archive file, such as a .zip file or the like) or could notify the user that the source code is ready to be downloaded (e.g., the user can click on a link provided in a notification that takes the user to a web page to download the source code in the second programming language).

Alternatively, it should be understood that the translation tool could be provided as a tool on the web page the user is obtaining the source code from. For example, the user could visit a web page, browse for source code providing a particular functionality, and when code providing the desired functionality is identified, the user could be presented with an option to select the OOP language the user would like to receive the source code in (e.g., Java, C++, C#, etc.). In this manner, the user would not have to upload the source code to a different website as the translation tool is executing on the web page the user obtained the source code from. Again, the source code would be provided in the desired OOP language as a file(s) pushed out to the user or provide a notification allowing the user to pull the file(s) as desired.

It is further understood that in another embodiment the user may be provided with a preview of the individual translated files. For example, the user may select source code and then have the translation tool translate the selected source code to a desired OOP language. Once translated, the user could be presented with a preview of individual files that have been translated by the tool. In still another embodiment, the translation tool could allow the user to execute the translated program over the Internet to view and/or evaluate the functionality of the translated source code.

It is further understood that in another embodiment the user may choose to compile and build the translated source code into an executable binary application package or a binary library. Once built, the executable binary application package or binary library could be pushed to one or more app stores, software component stores, or beta testing sites, such as TestFlight® (testflightapp.com). In addition, the user may choose to build the application or library for a multiplicity of OS platforms, device platforms, app stores, and beta testing sites. In addition, the user may choose to package source code along with the binary application or library, which may be necessary to satisfy open source licensing requirements or other deployment requirements.

It is further understood that the user may subscribe to automatic updates to translated source code as well as to binary executable applications and libraries built from such translated source code. The translation process and updates could be triggered by commits to the source code of user-specified projects in an online source code repository, such as GitHub. Alternatively, the automatic updates could be scheduled at a user-specified time interval, such as hourly or daily. In either case, the latest source code would be obtained from user-specified source code repository before translation and building. In addition, the translation tool and build process could be run by a continuous integration server, such as Jenkins.

Throughout this application the following definitions apply:

The term "data" as used herein means any indicia, signals, marks, domains, symbols, symbol sets, representations, and any other physical form or forms representing information, whether permanent or temporary, whether visible, audible, acoustic, electric, magnetic, electromagnetic, or otherwise manifested. The term "data" as used to represent particular information in one physical form shall be deemed to encompass any and all representations of the same particular information in a different physical form or forms.

The term "storage" as used herein means data storage devices, apparatus, programs, circuits, systems, subsystems, or other elements whether implemented in hardware, software, or both, and whether used to process data in analog or digital form, into which data may be entered, and from which data may be obtained, as desired. Storage can be primary and/or secondary and can store data in electromagnetic, magnetic, optical, magneto-optical chemical and/or holographic forms.

The term "processor" as used herein means data processing devices, apparatus, programs, circuits, systems, and subsystems, whether implemented in hardware, software, or both, and whether used to process data in analog or digital form. The processor can operate on data in electromagnetic, magnetic, optical, magneto-optical chemical and/or holographic forms.

The terms "communicate", "communicating" and "communications" as used herein include both conveying data from a source to a destination, as well as delivering data to a communications medium, system or link to be conveyed to a destination. The term "communication" as used herein means the act of communicating or the data communicated, as appropriate.

The terms "coupling", "coupled", "coupled to", and "coupled with" as used herein each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, or (c) a functional relationship in which the operation of any one or more of the relevant devices, apparatus, files, programs, media, components, networks, systems, subsystems, or means depends, in whole or in part, on the operation of any one or more others thereof.

The term "network" as used herein means the communications linkage used to join two or more units, such as systems, networks, links, nodes, equipment, circuits, buses, and devices and includes without limitation networks of all kinds, including coupling amongst components of a system, both intra-networks and inter-networks and including, but not limited to, the Internet, and is not limited to any particular such network.

The terms "computer language" and "computer programming language" as used herein mean a computer programming language for accomplishing software development and/or expressing the source code of a computer program. Furthermore, a "computer programming language" may or may not be classified as object-oriented. "Computer programming languages" include, but are not limited to, Java, C#, and C++.

The terms "virtual machine (VM)," "virtual machine environment," "managed runtime," and "managed runtime environment (MRE)" as used herein refer to an apparatus, either software or hardware, which executes bytecode. Virtual machines may also include a platform application programming interface (API) or platform classes that bytecode programs may call or otherwise make use of. Virtual machines are designed to isolate software programs from the underlying native hardware and software platform, which facilitates the creation, deployment, and execution of distributed, secure, platform-independent software programs and components. Java and C# are designed for virtual machine environments, whereas C++ is not.

The term "bytecode" as used herein refers to a non-native binary representation of an executable program or software component. Bytecode is designed to be executed by a virtual machine. Bytecode may also be referred to as an "intermediate language (IL)."

The term "garbage collector" as used herein refers to an apparatus for automated object management, where allocated memory is automatically reclaimed when it is unneeded, which is accomplished through a housekeeping process. The housekeeping process may further include memory compaction. The housekeeping process is generally performed non-deterministically at the primary discretion of the garbage collector. Virtual machine environments, such as those for Java and C#, include a garbage collector. Legacy and ANSI C++ programming environments do not include a garbage collector.

The term "SourceUnit" is the smallest unit of autonomous source code, which may be compiled, interpreted, or executed, depending on the capabilities of the source language. This generally refers to an individual source code file, such as in Java, C++, or C#. In C++ and some other languages, a SourceUnit may be referred to as a "compilation unit."

The term "Document Object Model (DOM)" is an object-oriented programming interface for representing the different conceptual elements of a document. Furthermore, the individual elements in a DOM may be stored in a hierarchy.

The term "SourceUnit DOM" is a specialized DOM for representing the different conceptual elements of a source code file or document. The SourceUnit DOM is only intended for representing source code files. The conceptual elements making up a SourceUnit DOM include: single line comment, multiple line comment, package statement, import statement, class definition, field definition, implementation block, implementation statement, method definition, static constructor definition, exception statement, control flow statement, and text. There is only one SourceUnit DOM per SourceUnit. The SourceUnit DOM is a complete representation of the original SourceUnit, including its formatting. Alternatively, the term "SourceUnit DOM" may also apply to an Abstract Syntax Tree (AST) that serves the same purpose of representing the different conceptual elements of a source code file or document.

The term "tagged element" is a note inserted by the translator that contains extra information to be preserved through the translation process. A tagged element is embedded inside specially denoted single line comment or multiple line comment elements. This extra information captures logic and other content from the original source files that typically cannot be preserved in translation but through such tagged elements allows such logic and content to be preserved in translated results.

The term "keyword" means a word that always has the same meaning and cannot be used for any other purpose, i.e., as identifiers.

The term "class" is a type in an object-oriented programming language. A class may have methods, data fields, and inner-classes (classes within classes), which may all be generically referred to as "class members." The term "class" also can refer to an "interface."

The term "object" is an instance of a class.

The term "method" is a function or procedure that a particular class may do. A method may or may not be provided with variable parameters, and it may or may not return a value. A method is always associated with a particular class, and it may be referred to as a "class member." The term "method" also applies to constructors and destructors.

The term "constructor" is a function or procedure that will be used to initialize an object, which an instance of a particular class. A constructor may or may not be provided with variable parameters, and it may not return a value. A constructor is always associated with a particular class, and it may be referred to as a "class member." A class must have at least one explicit or implicit constructor in order to instantiate instances of itself.

The term "destructor" is a function or procedure that will be used to destruct an object, which an instance of a particular class. A destructor may not be provided with variable parameters, and it may not return a value. A destructor is always associated with a particular class, and it may be referred to as a "class member." A class may have only one destructor, which itself is optional. In Java, a destructor is called a "finalizer."

The term "data field" is a variable that a particular class contains. A data field may be a numeric value, a Boolean value, an object reference, or an interface reference, or an array reference. A data field is always associated with a particular class, and it may be referred to as a "class member."

The term "interface" is a class that declares one or more methods, but it does not define (implement) any of these methods. Instead, other classes which implement a particular interface must themselves define (implement) all of the interface's methods.

The term "class declaration" is the declaration of a new class (or interface) type. A class declaration is sometimes referred to as a "class interface." It describes the constructors, destructor (finalizer), methods, data fields, and inner-classes (a class within a class) that make up a particular class. Constructors, destructor, methods, data fields, and inner-classes of a particular class may be referred to generically as "class members." A class declaration defines the access control for each of its class members, be they constructors, destructor, methods, data fields, or inner-classes. A class declaration also details which class this class inherits from which includes its superclass and any interfaces it implements. Certain computer languages like C++ allow separating class declarations from class implementations, whereas other languages like Java and C# combine both the class declaration and class implementation into the class definition. A public class declaration makes a particular class accessible so that other (external) classes can create or interact with instances of the class. In turn, other (external) classes come to depend on the class declaration, which necessitates that the class declaration remains consistent.

The term "class implementation" is the implementation of a newly declared class type. It implements its constructors, destructor, methods, static data fields, and inner-classes. Certain computer languages like C++ allow separating class declarations from class implementations, whereas other language like Java and C# combine both the class declaration and class implementation into the class definition. The class implementation is not directly accessible to other (external) classes but only the class declaration is. This means that the internal class implementation may potentially be changed without adversely affecting other classes which depend on its class declaration.

The term "class definition" is the definition (implementation) of a new class type. The exact meaning of this term differs from computer language to computer language. For Java and C#, this refers to the combined class declaration and class implementation. In C++, this refers only to the class implementation.

The terms "first" and "second" are used to distinguish one element, set, data, object or thing from another, and are not used to designate relative position or arrangement in time.

The term "object oriented" programming language is programming that represents concepts as objects that include data fields and associated procedures. Object oriented programming languages include for example but are not limited to, C++, Java, Objective-C, C#, Smalltalk, Perl, PHP, Ruby and Python.

In one advantageous embodiment a computer language translator is provided that includes translating software executing on a computer having a storage. The translating software is provided for translating a first OOP computer language source code to a second OOP computer language source code. The translating software comprises an emulated Application Programming Interface library including a table accessible by said translating software on the computer. The API library has data indicative of types of data manipulations between the first computer language source code and the second computer language source code. The table includes second computer language equivalent functions callable by the second computer language. The translator is provided such that the translating software identifies the type of data manipulation the first computer language source code performs and accesses the table of the API library and correlates the type of data manipulation the first computer language source code performs to second computer language source code. The translator is further provided such that the translating software generates second computer language source code based in part upon identified equivalent functions in the second computer language.

In another advantageous embodiment a method is provided for translating a first OOP computer language source code to a second OOP computer language source code comprising the steps of providing a computer with a storage, the computer having translation software executing thereon. The method further comprises the steps of providing an emulated Application Programming Interface library having data indicative of types of data manipulations between the first computer language source code and the second computer language source code. The method further comprises the steps of providing a table associated with the API library including second computer language equivalent functions callable by said second computer language. The method still further comprises the steps of identifying the type of data manipulation the first computer language source code performs and accessing the table and correlating the type of data manipulation the first computer language source code performs to second computer language source code. The method also comprises the steps of generating second computer language source code based in part upon identified equivalent functions in the second computer language.

In still another advantageous embodiment a computer language translation tool for translating a first OOP computer language source code to a second OOP computer language source code is provided comprising a computer having software executing thereon. The software comprises a translation module and an emulated Application Programming Interface library module. The API library includes data indicative of types of data manipulations of the first OOP computer language source code and second computer language API equivalent functions callable by said second computer language. The translation module accesses the table of the API library and correlates the type of data manipulation the first OOP computer language source code performs to second OOP computer language source code. The software also comprises a generation module generating second OOP computer language source code based in part upon identified equivalent functions in the second computer language.

In yet another embodiment a method for providing source code in a desired Object-Oriented Programming (OOP) computer language is provided, the method comprising the steps of providing a server having a network connection and an interface allowing a user computer to access the sever via the network connection; presenting the user with a plurality of source code functionality corresponding to a plurality of files; and receiving a selection of from the user of a selection of at least one of the plurality of files. The method further comprises the steps of receiving a desired OOP computer language selection from the user; and providing a translation tool executing on the server. The translation tool includes an emulated Application Programming Interface (API) library including a table. The API library has data indicative of types of data manipulations of the first OOP computer language source code; and second computer language API equivalent functions callable by said second computer language. The method further comprises the steps of accessing the table of the API library and correlating the type of data manipulation the first OOP computer language source code performs to second OOP computer language source code; and generating second OOP computer language source code based in part upon identified equivalent functions in the second computer language The invention and its particular features and advantages will become more apparent from the following detailed description considered with reference to the accompanying drawings.

DETAILED DESCRIPTION OF THE INVENTION

Figure 1:
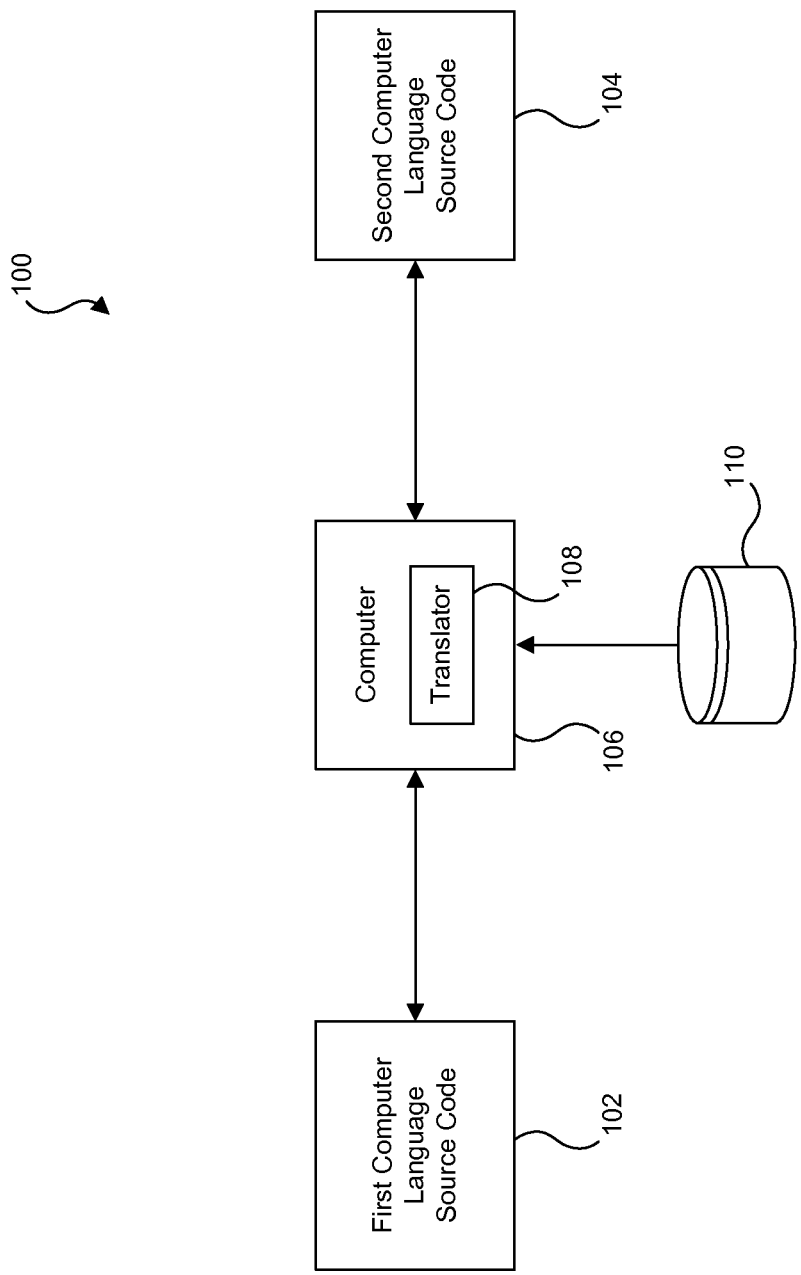
FIG. 1 is a block diagram illustrating an advantageous embodiment of the present invention.

FIG. 1 illustrates an advantageous embodiment of translation system 100. Translation system 100 is shown including, first computer language source code 102, computer 106, translator 108, library 110 and second computer language source code 104.

First computer language source code 102 may comprise any computer language however; in one advantageous embodiment comprise an OOP language such as for instance, Java, C#, C++ or scripting language, such as JavaScript, Python, Ruby, Perl and/or PHP. Computer 106 may also comprise any computer capable of receiving first computer language source code 102. Translator 108 in an advantageous embodiment comprises software, executing on computer 106 to received and process first computer language source code 102. While translator 108 executes on computer 106, it is not necessary that translator 108 reside on computer 106. For instance, translator 108 may comprise software residing on another computer (not shown) to which computer 106 is connected over, for instance, a network. The network connection may comprise for instance, a hard wired and/or wireless network, e.g. employing bus connections, parallel cable, serial cable, coaxial cable, fiber optic, twisted wire pair, USB cable, infrared link, radio frequency link, microwave link, satellite link and/or the like.

Also provided in FIG. 1 is library 110 which is coupled to and accessible by computer 106. In one advantageous embodiment, library 110 comprises data indicative of relationships between the first computer language source code 102 and the second computer language source code 104. In another advantageous embodiment, library 110 may comprise data for correlating particular functions of the first computer language source code 102 to the second computer language source code 104. In still another advantageous embodiment library 110 may comprise, for instance, a database.

Once translator 108 has analyzed first computer language source code 102, translator 108 then generates second computer language source code 104. Again, second computer language source code 104 may comprise any computer language such as for instance, an OOP language including Java, C#, C++ or a scripting language, such as JavaScript, Python, Ruby, Perl and/or PHP. Translation system 100 may be operated in various modes of operation including, fully automated, manual and/or combinations thereof.

As illustrated in FIG. 1, translator 108 generates second computer language source code 104. For instance, when first computer language source code 102 comprises Java and second computer language source code 104 comprises C++, there is a C++ implementation of the Java language. There is true translation from, in this example Java to C++. This means that there is no requirement for interoperability between Java and C++ and therefore, no need to utilize a virtual machine after translation.

It should further be noted that the arrows indicated from first computer language source code 102 to computer 106 and from second computer language source code 104 to computer 106 are shown bi-directional. This illustrates the bi-directionality of translator 108. For instance, first computer language source code 102 may be input to computer 106 and be translated to second computer language source code 104. Subsequently, second computer language source code 104 may then be input to computer 106 and be re-translated back to first computer language source code 102. Notably, as illustrated in FIG. 1, the re-translated first computer language source code is depicted as the same as the first computer language source code 102. This is possible because translator 108 translates first computer language source code 102 independent of the context of in which it is used. In this manner, the translation of various elements of the source code is always consistent and therefore reversible because of the direct correlation between various elements of the first computer language source code 102 to the second computer language source code 104.

Figure 2A:
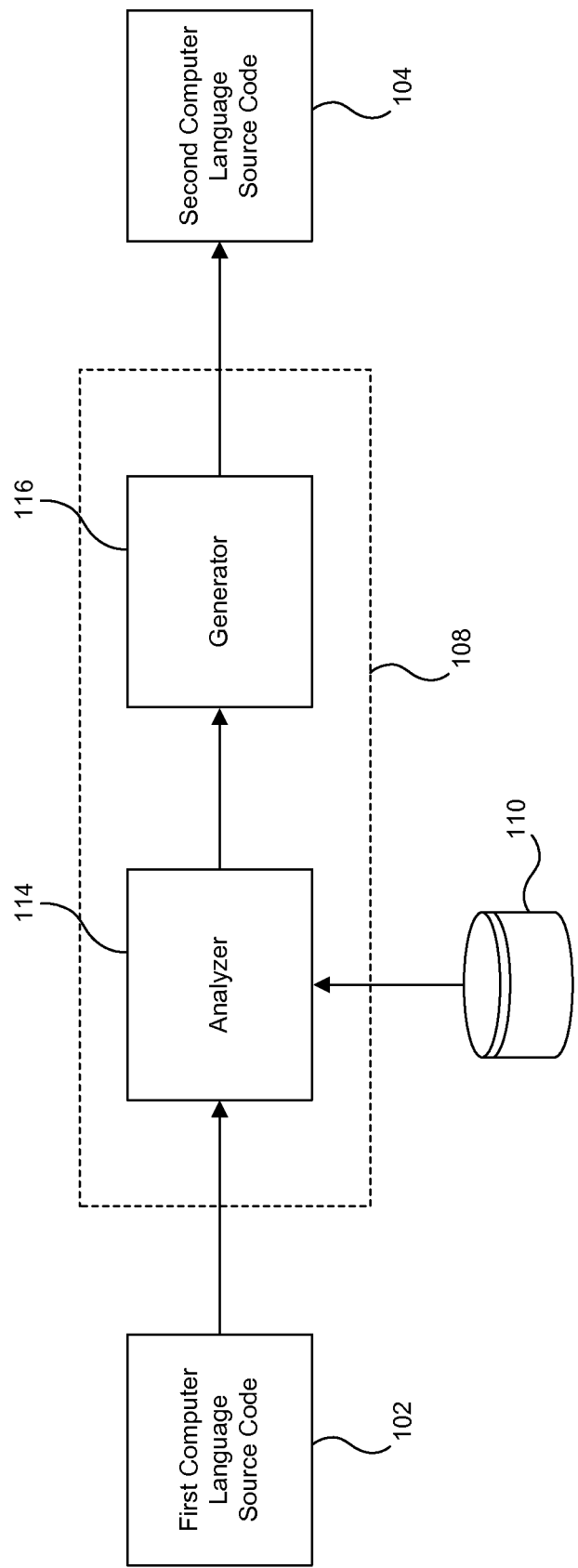
FIG. 2A is a block diagram according to FIG. 1 illustrating an advantageous embodiment of the present invention.

FIG. 2A illustrates one advantageous embodiment of the present invention that expands translator 108 into analyzer 114 and generator 116. In this embodiment the translation process is divided into two steps: (1) analysis and (2) generation.

First computer language source code 102 is input to translator 108, which has as a first block, analyzer 114. Analyzer 114 is also coupled to library 110 which, as previously discussed, comprises data indicative of relationships between the first computer language source code 102 and the second computer language source code 104. Analyzer 114 will analyze the function of the first computer language source code 102 and then correlate the function to second computer language source code 104. In one advantageous embodiment, analyzer 114 will logically traverse or cycle through first computer language source code 102 in order to build class declarations and/or class definitions.

Analysis encompasses traversing all the elements of a particular SourceUnit DOM in order to produce high-level programming entities. For converting Java to C++ for instance, such high-level programming entities include the main public class and any supporting classes. These classes may, in turn, be made up of methods, fields, static constructors, and inner-classes. In another advantageous embodiment, analysis may also entail some language-specific pre-generation work, such as organizing high-level programming entities differently for certain target languages, such as C++.

Once analyzer 114 has built the class declarations and/or class definitions, these are sent to generator 116 for generation of second computer language source code 104. Generation is the process of producing source code in the target language from the high-level programming entities, such as public classes, produced from the analysis step. Generation may further re-organize high-level programming entities for correctness in the target language. Generation may still further entail adding embedded tagged elements where necessary so as to preserve the full semantic meaning of the original language and to facilitate bidirectional translation, if desired.

One problem that the generator may encounter during generation is a conflict between keywords between the first computer language source code 102 and the second computer language source code 104. For instance, identifier names in the source language may conflict with keywords in destination language. Such conflicts must be resolved in a consistent manner and preserve the syntactical correctness and readability of the translated result. Name resolution may require name adjustment, which is a mild form of name mangling. Identifier names which conflict with keywords or other features of the destination language must be adjusted. In such a case, the name is mildly mangled with the best effort being made to preserve the name as readable as possible. More common standard conforming identifier names are usually mangled less than uncommon nonstandard identifiers. This strategy is weighted toward preserving the readability of content which is already deemed readable due to its standards conformance.

Figure 2B:
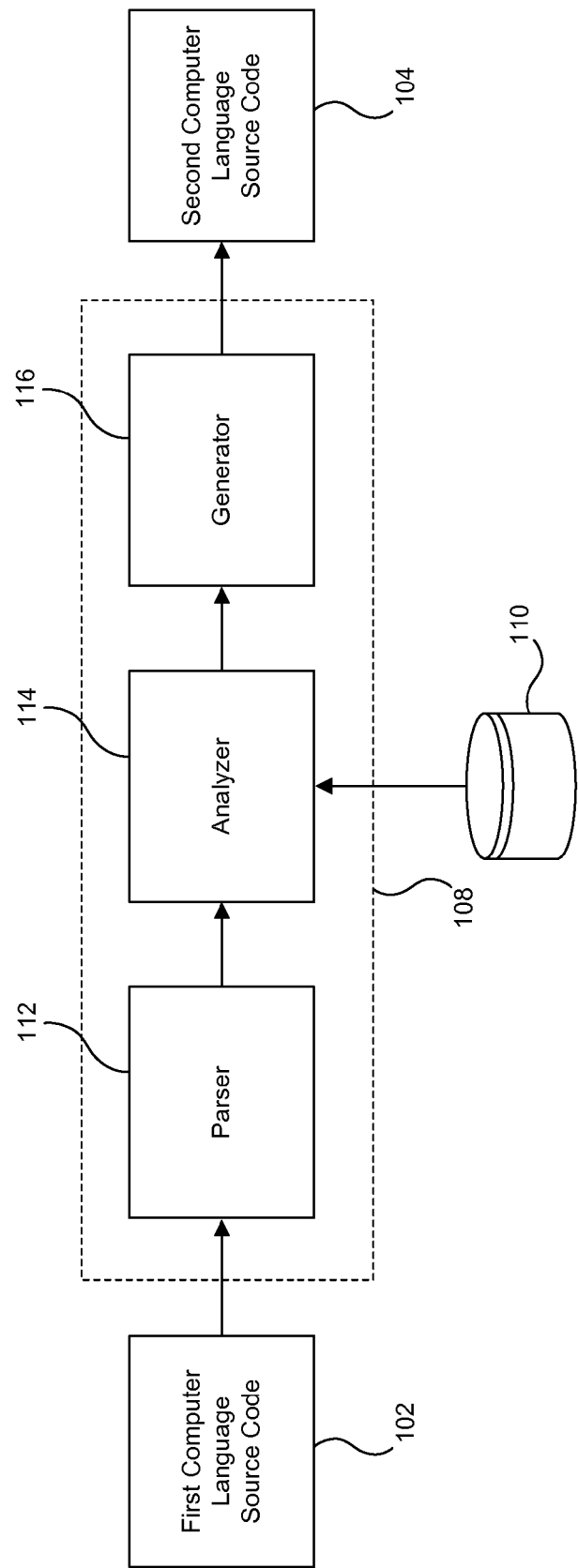
FIG. 2B is a block diagram according to FIG. 1 illustrating an advantageous embodiment of the present invention.

In an alternative embodiment, FIG. 2B illustrates another expanded view of translator 108 that includes: parser 112, analyzer 114, and generator 116. The translation process according to FIG. 2B may be divided into three steps: (1) parsing, (2) analysis, (3) generation.

First computer language source code 102 is input to parser 112. Parser 112 is provided to parse first computer language source code 102 into parsed elements prior to transmission to analyzer 114 for building of class declarations and/or class definitions. The parser is essentially provided to turn the document into a hierarchy of elements including, for instance but not limited to: comments (such as inserting a tagged element), class definitions, variable declarations, and/or method calls. Parsing entails breaking each original language source code file down into corresponding elements in a SourceUnit DOM.

The remaining elements are similar to those discussed in connection with FIG. 2A and will not be repeated here.

Figure 3:
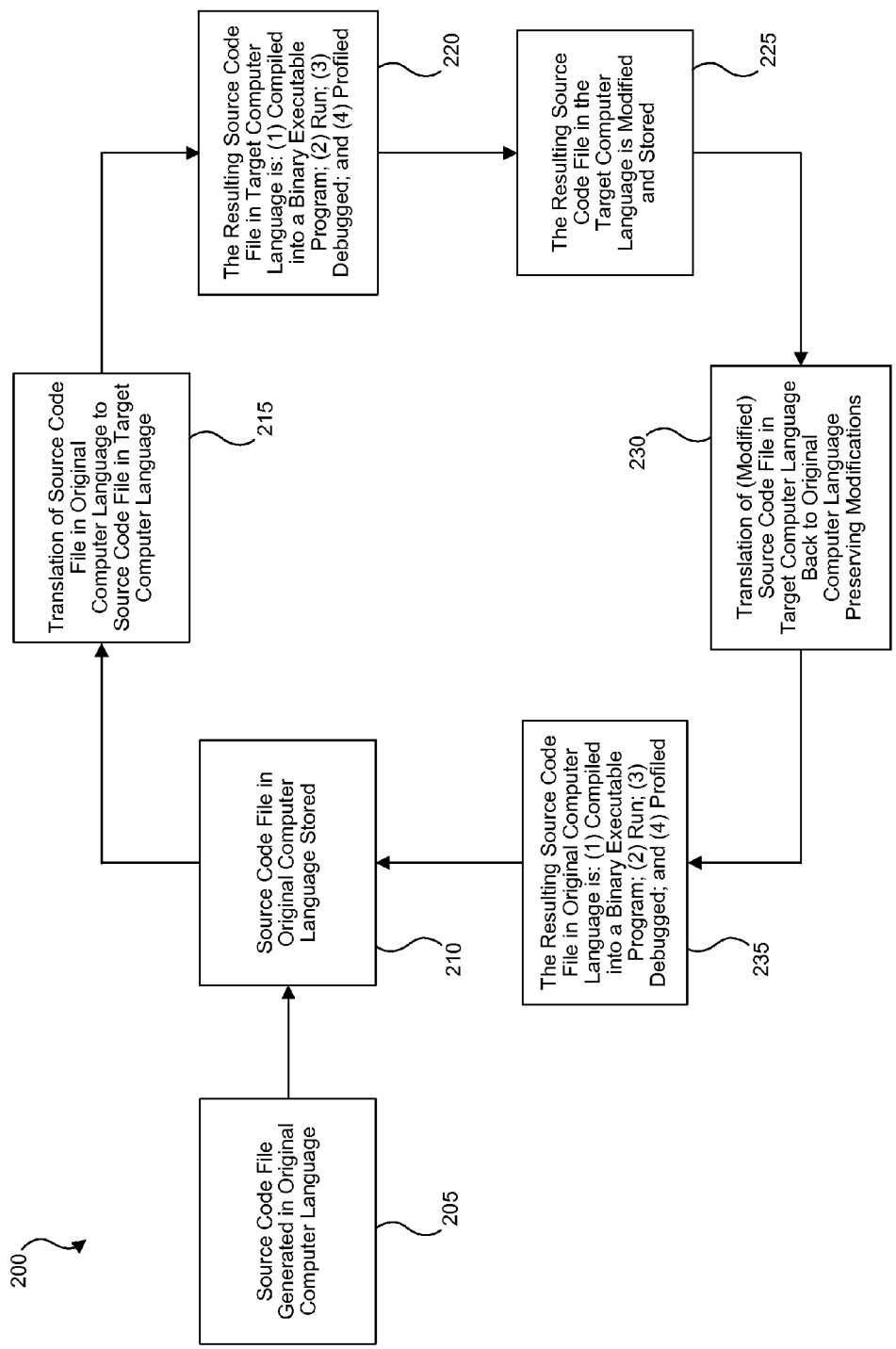
FIG. 3 is a block diagram illustrating some steps involved in bi-directional translation according to another advantageous embodiment of the present invention.

FIG. 3 illustrates the process 200 of converting original source files to a target language and translation back to the original language. As a first step, a source code file is generated in the original computer language 205. This original computer language may be any computer language as previously discussed in connection with FIG. 1. Once the source code in the original computer language is generated, the source code file in the original computer language is stored 210. This may be local storage, for instance on the computer where the original code was generated or over a network. In addition, the storage may be permanent, semi-permanent or temporary. For instance, the original source code may be stored on a magnetic or optical drive and/or disk, or may only be resident in RAM.

The next step is translation of source code file in original computer language to source code file in target computer language 215. This process would include for instance, the processes variously described in connection with FIGS. 1-2B. Once the translation process is completed, the resulting source code file in the target computer language may be (1) compiled into a binary executable program; (2) run; (3) debugged; and (4) profiled 220. To accomplish this step, any number of commercial compilers may be utilized, for instance, Java and C# may be compiled to bytecode while C++ may be compiled to native code. The steps of running the program, debugging and profiling will be minimized due to the translation step. Finally, the resulting source code file in the target language is modified (as necessary) and stored 225.

The result is a highly accurate translation of the original source code file to the target source code file that will function as seamlessly as the original source code file, preserving the syntax and function of the original source code file. The process 200 of converting original source files to a target language is reversible as illustrated in FIG. 3. The process is reversed by the translation of the source code file in the target computer language back to the original computer language 230. It should be noted however, the any modifications made to the source code file will be reflected in the re-translated source code. Once the target language source code file is re-translated to the original source code language, the resulting source code file in the original computer language may be (1) compiled into a binary executable program; (2) run; (3) debugged; and (4) profiled 235. As previously stated, any number of commercial compilers may be utilized to accomplish this step. As can be seen from FIG. 3, the process 200 has returned to the step of storing the source code file in the original computer language 210.

This bi-directional translation process 200 is possible in part, because the translation from the original source code to the target source code is accomplished without regard to the context. The translation of elements is always consistent, and thereby reversible. For instance, keywords and identifiers are always resolved in a consistent manner and preserve the syntactical correctness and readability of the translated result.

Figure 4:
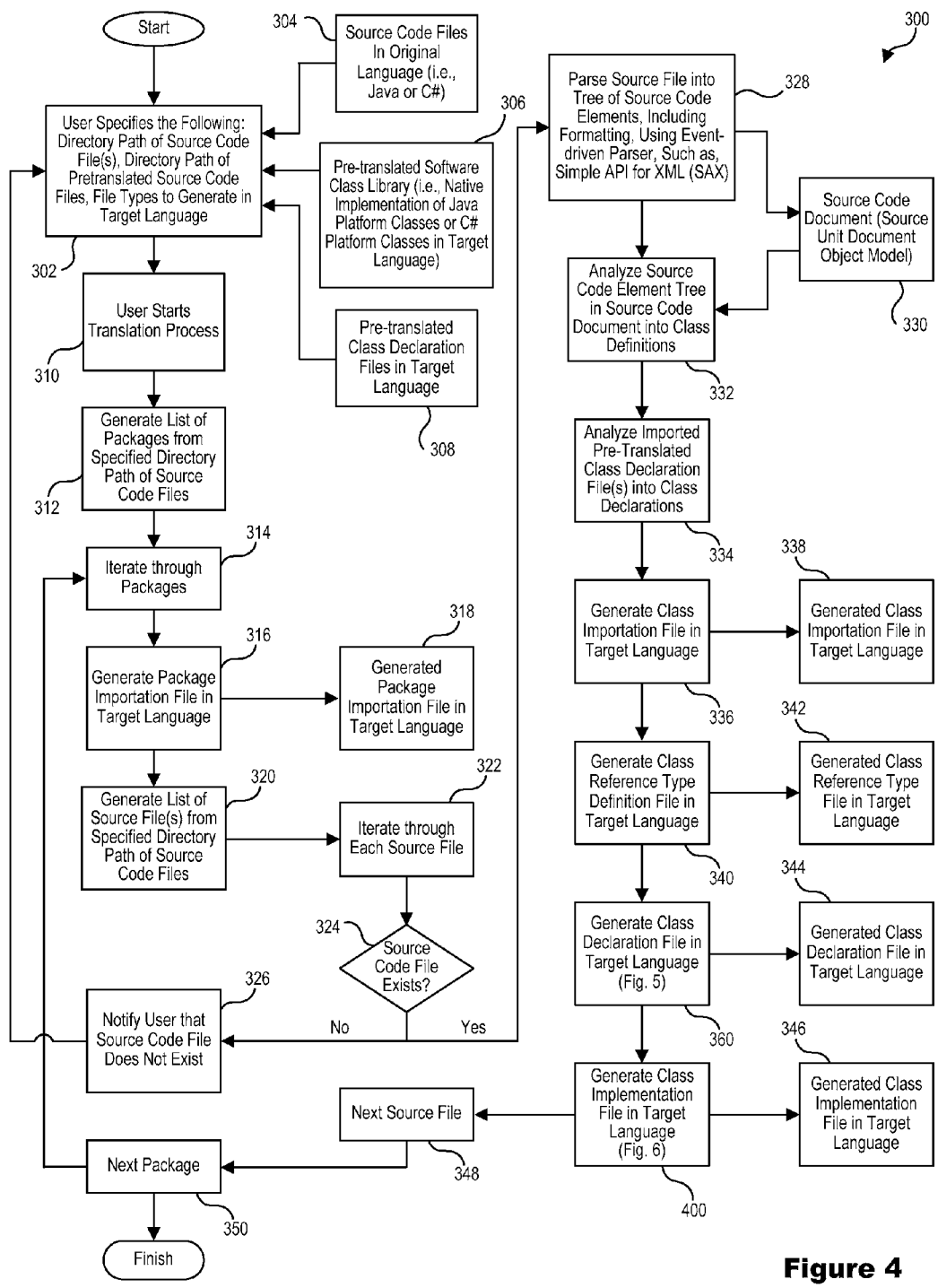
FIG. 4 is a flow diagram illustrating another advantageous embodiment of the present invention.

FIG. 4 is a flow diagram illustrating the steps taken in one advantageous embodiment by translation system 300 in translating source code from an original computer language to a target computer language. Translation system 300 provides the significant benefits of: maintaining the logic, expression, and formatting of the original source code files through translation, which in turn, facilitates re-translation back to the original computer language. The process may for instance, be user-initiated or initiated as a batch process and after initiation is fully automated, requiring no further user involvement.

Further, FIG. 4 details the various hierarchical array types and hierarchical array references types and their relationship to one another and other objects in the system. The array types support storing both one-dimensional and multi-dimensional storage of array elements. In addition, the hierarchical array reference types fully support inheritance for themselves and the elements they contain. In one advantageous embodiment, element count is read-only and is fixed when the array is created.

One problem associated with reference types is that external classes for instance, in C++ are stored in their own files called ("header files"). If one class makes use of another class, it must include the other class' header file before it declares its own class. A problem arises when the classes refer to each other creating a circular dependency. However, translation system 300 obviates this problem by declaring reference types in their own files. A reference type file then only needs to include the header file of its superclass and implemented interfaces. A superclass is a parent of the class that extends from it, and subclasses (or child classes) can never be their own parent thereby preventing the circular dependency problem.

Another advantage to this embodiment of the present invention is that the second computer language source code is utilized to implement types of data manipulations of the first computer language source code. When translating from Java or C# to C++, this provides the benefit of eliminating the need for a virtual machine because there is implementation of the original language's (i.e., Java or C#) platform classes in the target language (i.e., C++).

In another advantageous embodiment of the present invention, no garbage collector is required to automatically manage objects. Rather, translation system 300 automatically provides for object management making translation system 300 suitable for use with embedded systems.

As an initial step, the user (or the script file of a batch process) specifies the following: directory path of source code file(s), directory path of pre-translated source code files (if any), and file types to generate in target language 302. Of course, this initial step assumes that, the source code files in the original language (i.e., Java or C#) 304 have already been generated. In addition, pre-translated software class library (i.e., native implementation of Java platform classes, or C# and .NET platform classes in target language) 306, and pre-translated class declaration file(s) in target language 308 have been provided.

The next step is that the user (or the batch process) starts the translation process 310 followed by generation of the list of packages from the specified directory path of source code files 312. As used herein, source code projects are made up of one or more packages, which in turn variously comprise: classes, fields, methods, inner classes, blocks, statements and/or combinations thereof. A source code project includes all the source code files related to a particular software application program. Translation system 300 then iterates through the packages 314 so as to generate a package importation file(s) in the target language 316, which in turn results in a generated package importation file in the target language 318. The next step is to generate a list of source file(s) from the specified directory path(s) of source code files 320.

Translation system 300 then iterates through each source code file 322. At this point, translation system 300 resolves whether the source code file exists 324. If the source code file does not exist, translation system 300 will notify the user that the source code file does not exist 326 and will return to allowing the user to specify the directory path 302.

If however, the source code file does exist, translation system 300 proceeds to parse source file into tree of source code elements, including formatting, using an event-driven parser such as, for instance, Simple API for XML (SAX) 328. This high level parsing of the source code file results in the generation of source code document (SourceUnit DOM) 330. The parsing step is essentially provided to turn the source code file into a hierarchy of elements and is discussed in more detail in connection with FIG. 2B.

Next, translation system 300 performs an analysis of the source code by analyzing the source code element tree in the source code document into class definitions 332. The next step is to analyze imported pre-translated class declaration file(s) into class declarations 334. At this point, translation system 300 has logically traversed or gone through all of the parsed elements to build class definitions and class declarations to be used for generation of the target source code. In the building of the class definitions and class declarations, some preliminary broad pre-translation to the target language may also take place. This analysis has also been previously discussed in connection with FIG. 2A.

We next move to the actual generation of the target source code. As an initial step, translation system 300 generates a class importation file in the target language 336, which results in a generated class importation file in the target language 338. The next step is to generate a class reference type definition file in the target language 340, which also results in a generated class reference type file in the target language 342. Following this step is to generate a class declaration file in the target language 360, which too results in a generated class declaration file in the target language 344. The process of generating the class declaration file is described in more detail in connection with FIG. 5. Finally, translation system 300 generates a class implementation file in the target language 400, which results in a generated class implementation file in the target language 346. This step is also described in greater detail in connection with FIG. 6. This generation step has also been discussed in connection with FIG. 2A.

This completes the translation process of the specified source file such that translation system 300 proceeds to the next source file 348 and/or the next package 350, and returns to iterating through the packages 314. The process will be repeated until all packages have been translated.

Figure 5:
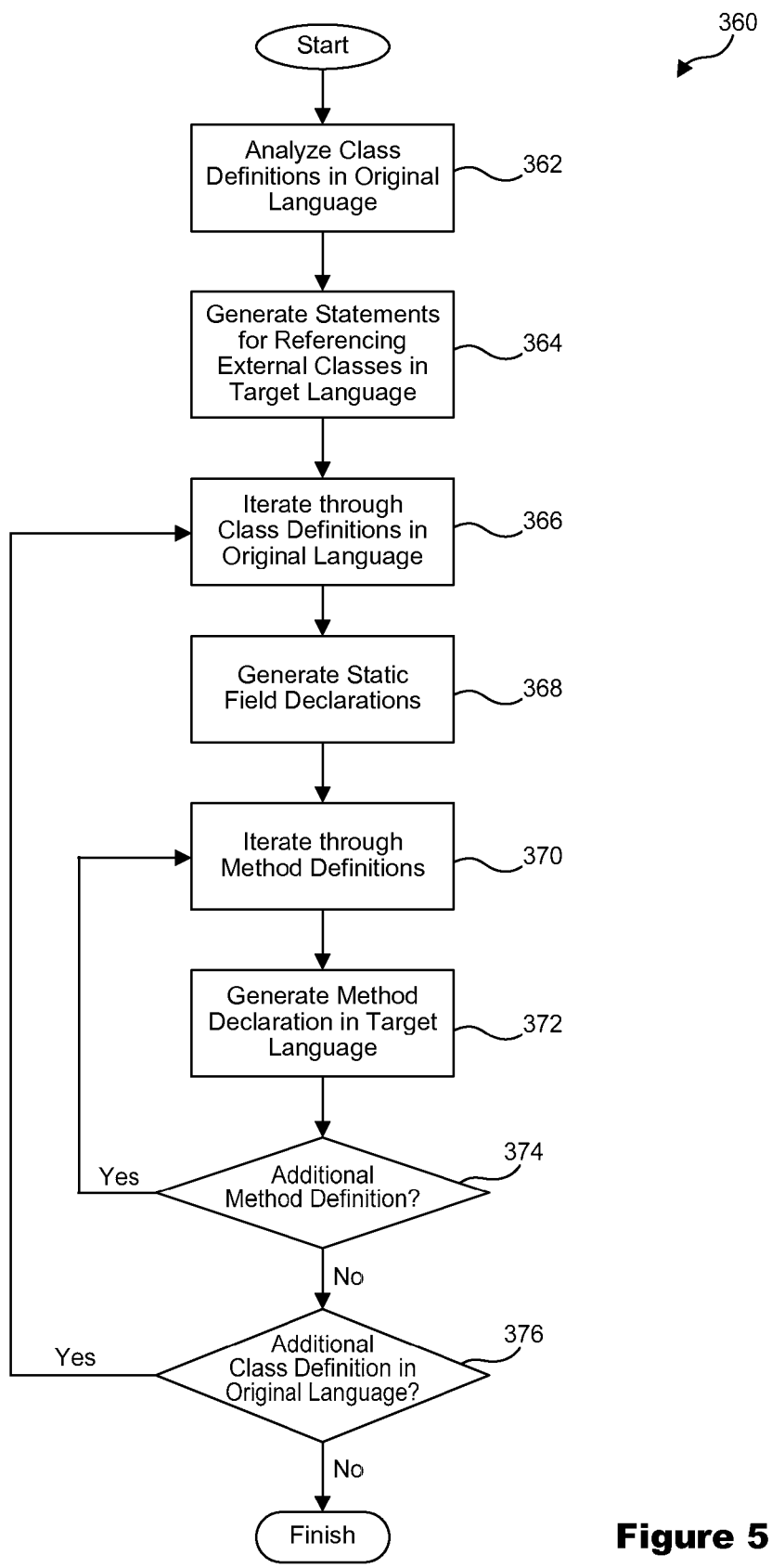
FIG. 5 is a flow diagram according to FIG. 4 illustrating another advantageous embodiment of the present invention.

FIG. 5 is an expanded view of the step of generating a class declaration file in the target language 360. As an initial step, analysis of class definitions in the original language 362 is performed, followed by generation of statements for referencing external classes in the target language 364. The next step is to iterate through the class definitions in the original language 366. For Java and C#, this includes for instance, one public class and zero or more private implementation classes. Once this step is completed, the system may generate static field declarations 368. The system then iterates through the method definitions 370. In this context, method refers to static initializer, constructors, destructor (finalizer), and methods. Again, once this step is completed, the system may generate method declaration(s) in the target language 372. If there are additional method definitions 374 and/or additional class definitions 376, the system will continue to iterate through those; if not the system will complete this step and move on to generating a class implementation file in the target language 400 as shown in FIG. 4.

Figure 6:
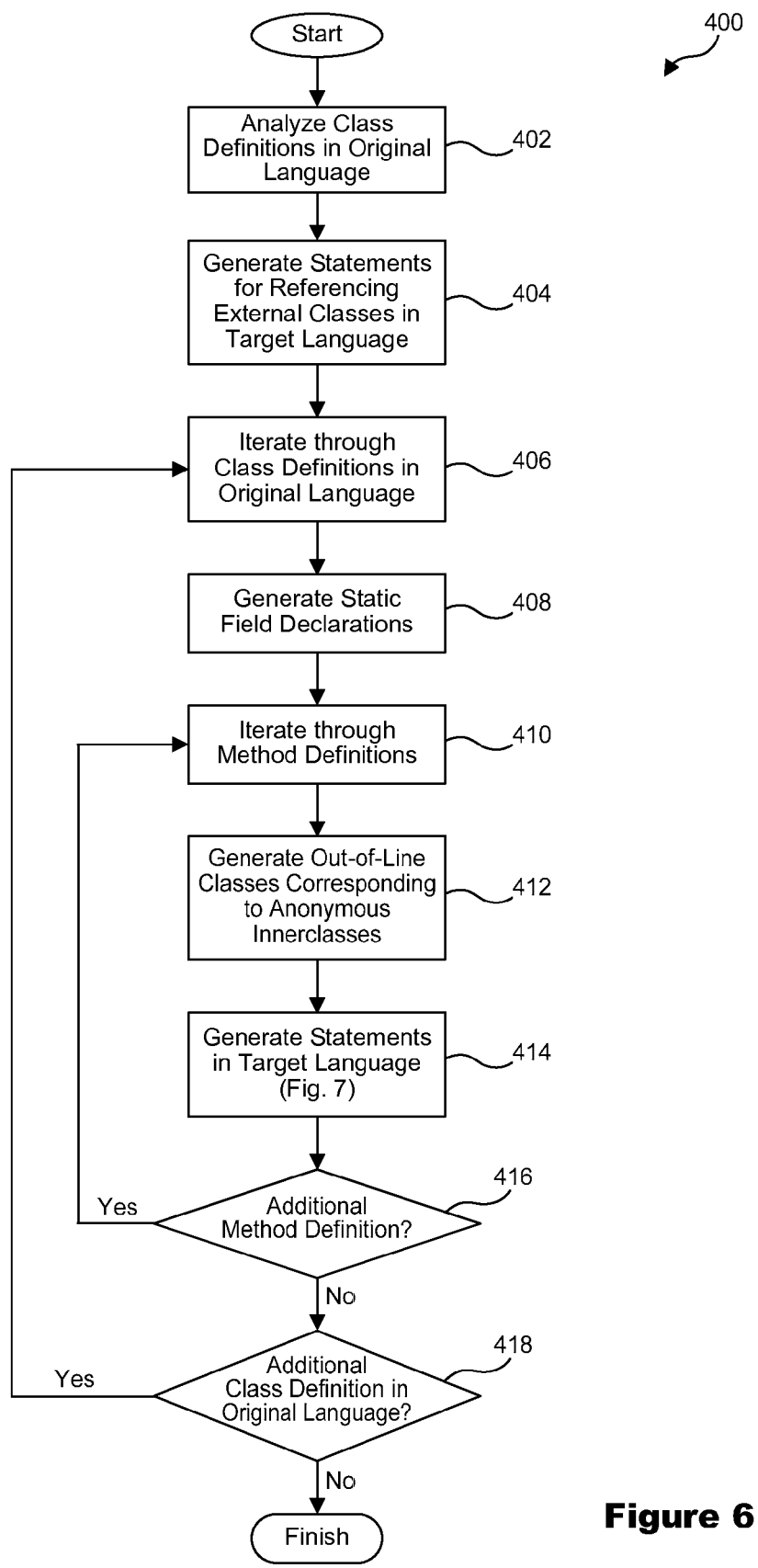
FIG. 6 is a flow diagram according to FIG. 4 illustrating another advantageous embodiment of the present invention.

FIG. 6 is an expanded view of the step of generating a class implementation file in the target language 400. Initially, analysis of class definitions in the original language 402 is performed. For Java and C#, this includes for instance, one public class and zero or more private implementation classes. This is followed by generation of statements for referencing external classes in the target language 404. This corresponds to "import" statements in Java and C#, and "#include" and "using" statements in C++. The system next iterates through class definitions in the original language 406 and then generates static field definitions 408. The system then proceeds to iterate through method definitions 410. Again, in this context, method refers to static initializer, constructors, destructor (finalizer), and methods. The system may then generate outof-line classes corresponding to anonymous inner-classes 412. In Java, anonymous inner-classes are defined inline within individual statements. These anonymous inner-classes are produced, in one advantageous embodiment, during analysis by analyzing the statements making up a method definition. The system next proceeds to generate statements in the target language 414. Again, in one preferred embodiment, references to anonymous inner-classes in individual statements are replaced with references to the corresponding generated out-of-line class names. If there are additional method definitions 416 and/or additional class definitions in the original language 418, the system will continue to iterate through those. If there are none left, the system will complete this step and proceed to determining if there is another source file 348 as shown in FIG. 4.

Figure 7:
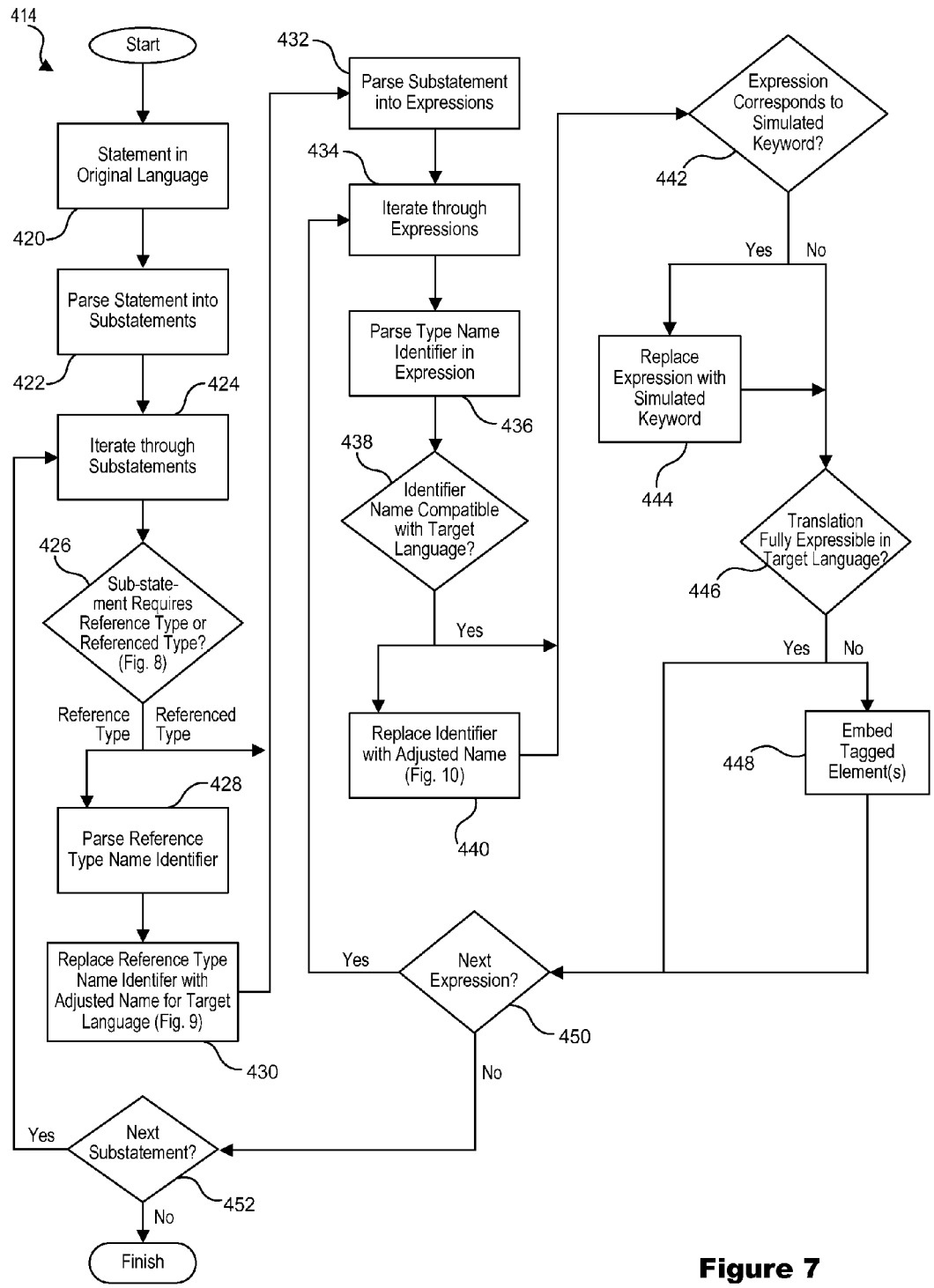
FIG. 7 is a flow diagram according to FIG. 6 illustrating another advantageous embodiment of the present invention.

FIG. 7 is an expanded view of the step of generating statements in the target language 414. FIG. 7 generally describes one advantageous embodiment of the process for translating a statement in the original language to the source language using simulated keywords and embedded tagged elements. This process enables results to be for instance, translated back to original language.

The system starts with a statement in the original language 420. Initially, the system parses the statement into sub-statements 422 and then iterates through the sub-statements 424. The system then determines if the sub-statement requires a reference type or a referenced type 426. This step is described further in connection with FIG. 8. If it is determined that a reference type is required, the system proceeds to parse the reference type name identifier 428, and replace the reference type name identifier with an adjusted name for the target language 430. This step is described further in connection with FIG. 9. Once this step is completed, the system proceeds to parse the sub-statement into expressions 432. Alternatively, in connection with determining if the sub-statement requires a reference type or a referenced type 426, if the system determines that a referenced type is required, the system will also proceed to parse the sub-statement into expressions 432. Once the sub-statements have been parsed into expressions, the system iterates through the expressions 434 and parses any type name identifier in the expression 436. At this point the system determines if the identifier name is compatible with the target language 438. If it is not, the system proceeds to replace the identifier with an adjusted name 440. This step is described further in connection with FIG. 10. Once the identifier is replaced with an adjusted name, or it is determined that the identifier name is compatible with the target language, the system proceeds to determine if the expression corresponds to a simulated keyword 442. If it is determined that the expression does correspond to a keyword, the expression is replaced with a simulated keyword 444. Once the expression is replaced with a simulated keyword or it is determined that the expression does not correspond to a simulated keyword, the system proceeds to determine if the translation is fully expressible in the target language 446. If the translation is not fully expressible in the target language, the system will proceed to embed tagged elements or a tag 448 in the translated language. Once the tagged element is embedded or it is determined that the translation is fully expressible in the target language, the system proceeds to the next expression 450 and/or the next sub-statement 452 to repeat the above-described process until all expressions and sub-statements are translated. If it is determined that there are no more expressions or sub-statements, the system proceeds back to the next step of determining if there are additional statements in the method definition that contains the statement. If it is determined that there are no more statements, the system proceeds back to the next step of determining if there are additional method definitions 416 as illustrated in FIG. 6.

The following is a table in extended BNF notation illustrating an example of a potential format of embedded content, which cannot be expressed in the target language and is therefore embedded as tagged elements within the comment sections:

| Syntax |
| --- |
| EmbeddedContent ::= EmbeddedComment+ (Expression+ EmbeddedComment+)? |
| Expression ::= expression in target language related to embedded content |
| EmbeddedComment ::= CommentBeginSymbol "//" TaggedElements CommentEndSymbol |
| TaggedElements ::= TaggedElement+ |
| TaggedElement ::= ("<" Namespace ":" ElementName " " ElementAttributes ">") | ("</" Namespace ":" ElementName " " ElementAttributes* ">") |
| Namespace ::= namespace for embedded tags (i.e., "pie") |
| ElementName ::= name of embedded element (i.e., "loopscope") |
| ElementAttributes ::= attributes for embedded element |
| CommentBeginSymbol ::= language-specific symbol or keyword ("/*" for C++, C#, Java) |
| CommentEndSymbol ::= language-specific symbol or keyword ("*/" for C++, C#, Java) |

| Source Code in Original Language (Java) | Translated Source Code in Target Language (ANSI C++, Visual C++ 6.0) |
| --- | --- |
| for (int index = 0; index < 10; index ++) {    index *= 2; } int index = 10; | /*//<pie:loopscope>*/ /*//</pie:loopscope>*/ for (pi__int index__ = 0; index__ < 10; index__ ++) {    index__ *= 2; } /*//<pie:loopscope>*/ /*//</pie:loopscope>*/ pi__int index__ = 10; |

The following is a table illustrating an example of simulated keywords used to provide corresponding features and forms of expression of the original language in the target language. Simulated keywords fully preserve all details of the expression of the original language so that the translated results in the target language can be accurately translated back to the original language, producing identical or substantially identical results to the original expressions in the original language.

| Expression in Original Language (Java) | Simulated Keyword Expression in Target Language (ANSI C++) |
| --- | --- |
| (className)objectInstance | pi__cast(className, *objectInstance) |
| (className)this | pi__cast(className, this) |
| objectInstance instanceof className | pi__instanceof(*objectInstance, className) |
| this instanceof className | pi__instanceof(this, className) |
| throws className | pi__throws(className) |
| throws className1, className2, . . . className9 | pi__throwsbegin(className1) pi__throwsalso(className2) . . . pi__throwsalso(className9) pi__throwsend( ) |
| switch (expression) { | pi__beginswitch(type, expression) |
| } (as used to end a switch block) | pi__endswitch( ) |
| case value: | pi__case(value) |
| default: | pi__default( ) |
| Null | pi__null |
| synchronized (as used within method definitions) | pi__synchronized |
| interface interfaceName | class pi__interfaceclass interfaceName |
| Boolean | pi__boolean |

Figure 8:
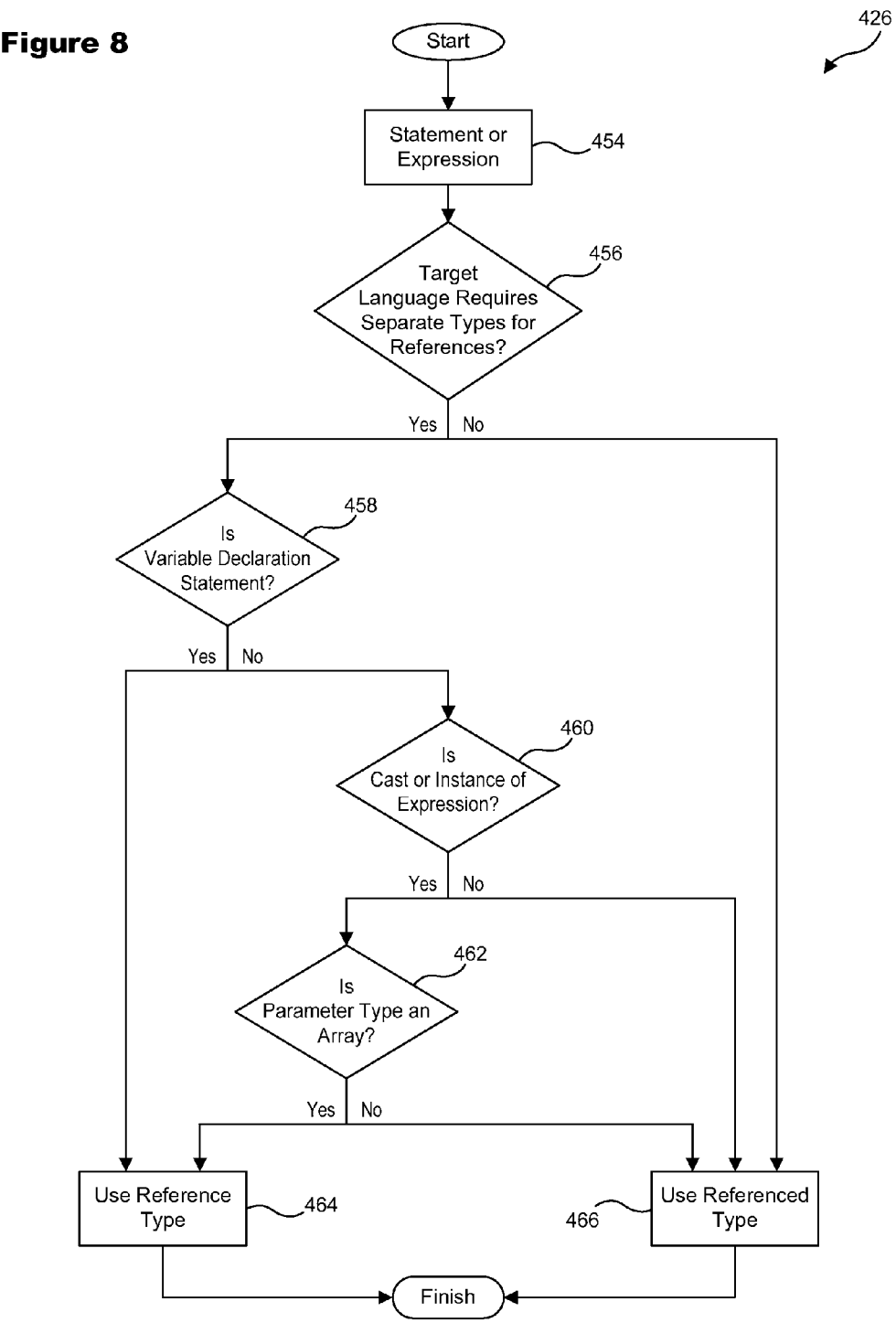
FIG. 8 is a flow diagram according to FIG. 7 illustrating another advantageous embodiment of the present invention.

FIG. 8 is an expanded view of the step of determining if the sub-statement requires a reference type or a referenced type 426. FIG. 8 generally describes the process of determining if the statement requires a reference type or a referenced type. In this advantageous embodiment, the process is demonstrated by the example of translating a statement or expression in the Java language to the C++ language. However, it is contemplated that this process may be modified for applicable with conversion of any computer language.

The system starts with a statement or expression 454. A determination is then made as to whether the target language requires separate types for references 456. If not, the referenced type is used 466. If however, the target language does require separate types for references, the system proceeds to determine if the statement or expression is a variable declaration statement 458. If not, the reference type is used 464. If however, it is determined that the statement or expression is a variable declaration statement, the system proceeds to determine if it is cast or an instance of expression 460. If not, the referenced type is used 466. If however, it is determined that it is cast or an instance of expression, the system proceeds to determine if the parameter type is an array 462. If not, the referenced type is used 466. If so, the reference type is used 464. The system then proceeds according to FIG. 7 as previously discussed.

Figure 9:
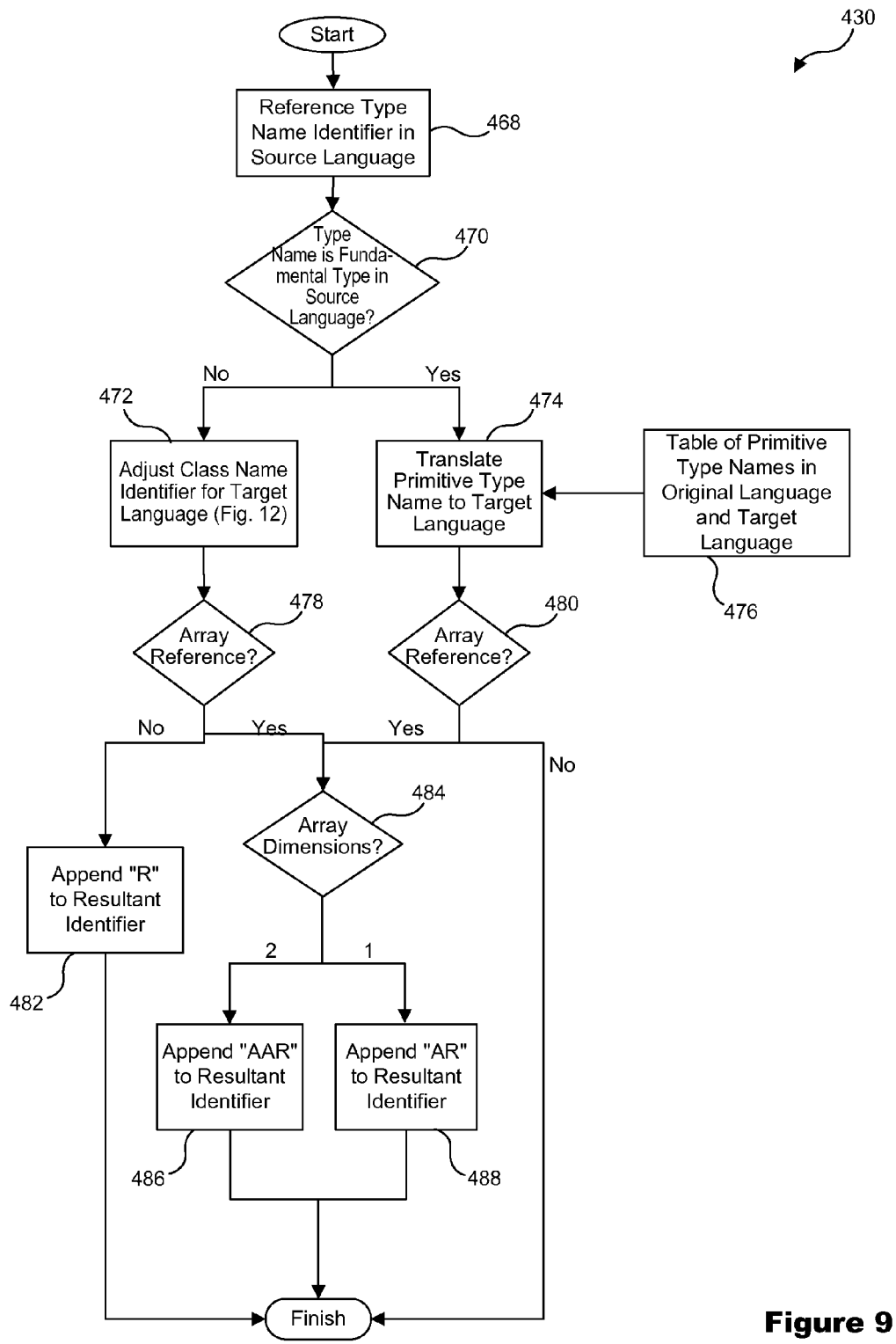
FIG. 9 is a flow diagram according to FIG. 7 illustrating another advantageous embodiment of the present invention.

FIG. 9 is an expanded view of the step of replacing the reference type name identifier with an adjusted name for the target language 430. Generally, in this step the identifier name is adjusted for the target language. If the variable type is not an array or is not a primitive, the name is further adjusted to be a reference type for the target language.

In this step, the system begins with a reference type name identifier in the source language 468. It is then determined if the type name is a fundamental type in the source language 470. If not, then the class name identifier is adjusted for the target language 472, which is described in more detail in connection with FIG. 12. Once this is completed, it is determined if the name is an array reference 478. If not, then the system will proceed to append a character to the resultant identifier 482. This character may be for instance, any alphanumeric character depending on the computer language. For example, an uppercase "R" may be effectively utilized in connection with the Java language because it is uncommon for Java variable type names to end with an uppercase "R" and it further indicates "Reference" to the user. Other suffixes however, may be effectively utilized in connection with other computer languages. Once the character is appended, the system completes this step.

If on the other hand, it is determined that the type name is a fundamental type in the source language according to step 470, then a primitive type name is translated to the target language 474. The system may, in one advantageous embodiment, reference a table of primitive type names in the original language and target language 476 to facilitate this step. Once this is completed, it is determined if the name is an array reference 480. If not, then the system completes this step.

If however, it is determined that the name is an array reference 478 and/or 480, the system will then proceed to determine the array dimensions 484. If it is determined that there is one dimension, two characters are appended to the resultant identifier 488. Again, in one advantageous embodiment, uppercase "AR" may be effectively used because it is uncommon for Java variable types to end with uppercase "AR" and it may indicate for instance, "Array Reference" to the user. Alternatively, if it is determined that there are two dimensions, three characters are appended to the resultant identifier 486. For instance, uppercase "AAR" may be utilized and indicate for instance, "Array of Array References" to the user. It is however contemplated that other suffixes may be effectively utilized in connection with other computer languages. Once these characters are appended, the system completes this step.

Figure 10:
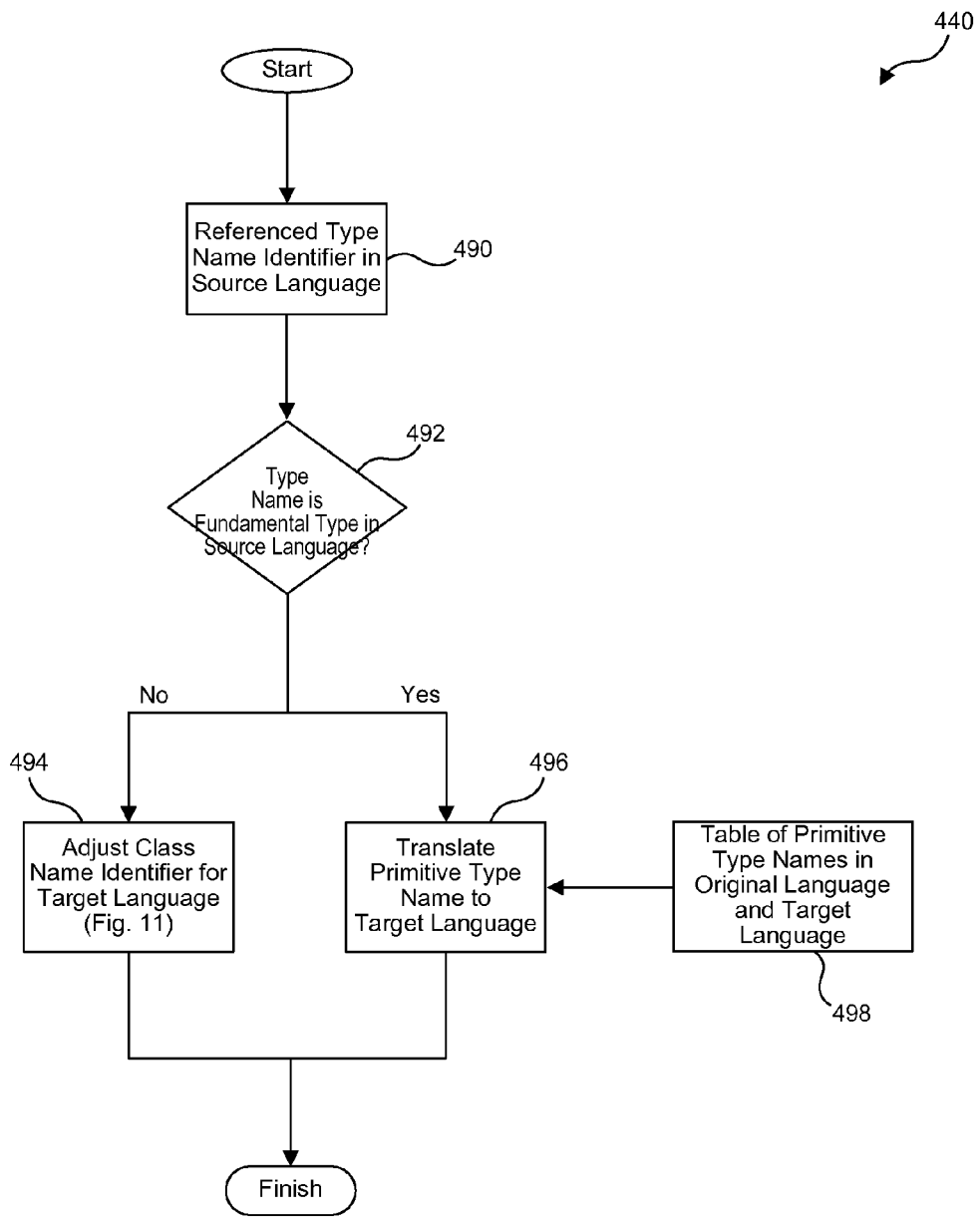
FIG. 10 is a flow diagram according to FIG. 7 illustrating another advantageous embodiment of the present invention.

FIG. 10 is an expanded view of the step of replacing the identifier with an adjusted name 440. FIG. 10 generally describes the process of adjusting referenced type name identifiers in the source language to a suitable name in the target language. The process of Identifier Name Adjustment is a mild form of name mangling that produces a fully human-readable name.

This step starts with a referenced type name identifier in the source language 490 and proceeds to determine if the type name is a fundamental type in the source language 492. If not, the class name identifier is adjusted for the target language 494. This step is described in greater detail in connection with FIG. 11. If however, the type name is a fundamental type in the source language, the system proceeds to translate the primitive type name to the target language 496. Again, in one advantageous embodiment, a reference table of primitive type names in the original language and target language 498 may be used to facilitate this step.

Figure 11:
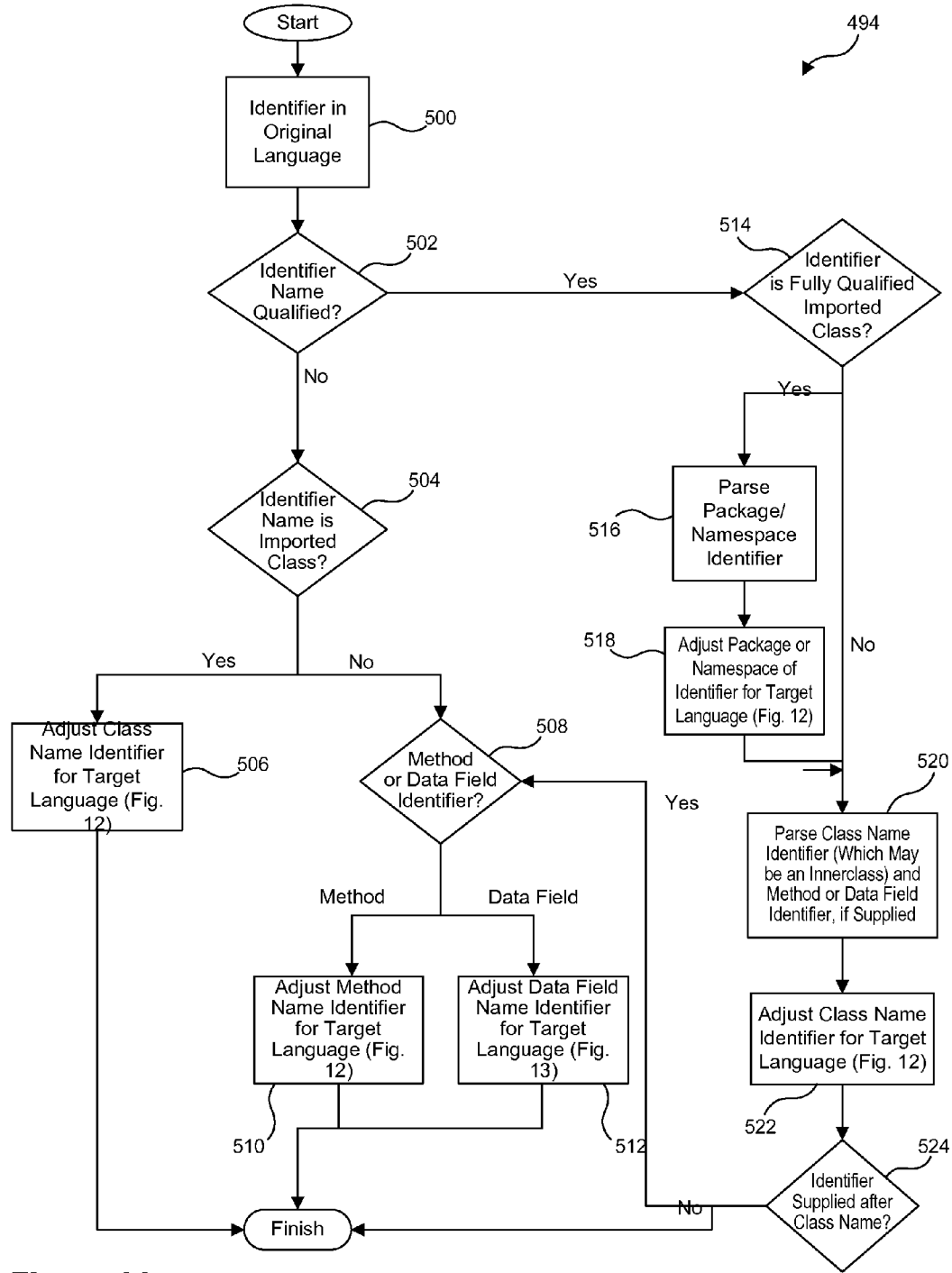
FIG. 11 is a flow diagram according to FIG. 10 illustrating another advantageous embodiment of the present invention.

FIG. 11 is an expanded view of the step of adjusting a class name identifier for the target language 494. FIG. 11 generally describes the process of adjusting composite unparsed identifiers into package names, class names, method names, and variable names and identifiers in the source language to a suitable name in the target language.

An identifier in the original language 500 is analyzed to determine if the identifier name is qualified 502. For clarity, a qualified name contains one or more identifier name separator tokens, for instance, Java and C# use the period "." character (i.e., java.lang.Object or System.object is qualified, but Object or object is not). If it is determined that the identifier name is qualified, the system proceeds to determine if the identifier name is an imported class 504, and in one advantageous embodiment may utilize a list of imported classes 506 to facilitate this determination. If the identifier name is an imported class, the system proceeds to adjust the class name identifier for the target language 506, which is discussed in greater detail in connection with FIG. 12. Alternatively, if the identifier name is not an imported class, the system proceeds to determining if the identifier is a method or a data field identifier 508. If it is determined to be a method identifier, the method name identifier is adjusted for the target language 510, which is again discussed in greater detail in connection with FIG. 12. However, if the identifier name is determined to be a data field, the data field name identifier is adjusted for the target language 512, which is discussed in greater detail in connection with FIG. 13.

Returning now to the step of determining if the identifier name is qualified 502, if it is determined to be qualified, the system proceeds to determine if the identifier is a fully qualified imported class 514. If so, the package/namespace of the identifier is parsed 516, and then the package or namespace of the identifier for the target language is adjusted 518, which is again described in greater detail in connection with FIG. 12. Once this step is completed or in the event the identifier is not a fully qualified imported class, the system proceeds to parse the class name identifier and method or data field identifier 520. It should also be noted that the class name identifier here may also comprise an inner-class. The class name identifier for the target language is then adjusted 522 as further described in connection with FIG. 12. Next it is determined whether an identifier is supplied after the class name 524. If not, this step is completed. If it is determined that an identifier is supplied after the class name, then the system proceeds to determine if the identifier is a method or a data field identifier 508 as previously discussed.

Figure 12:
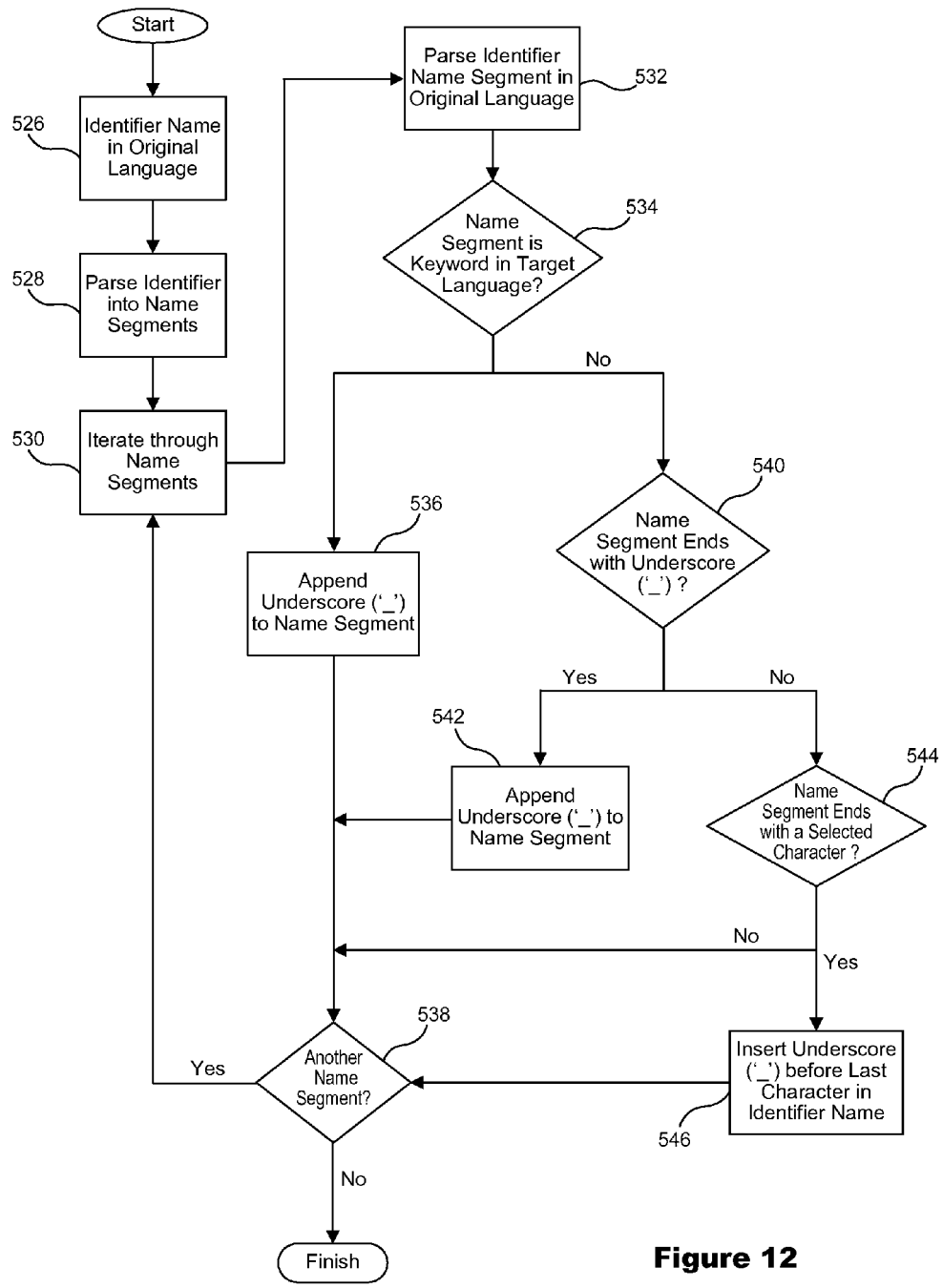
FIG. 12 is a flow diagram according to FIGS. 9 and 11 illustrating another advantageous embodiment of the present invention.

FIG. 12 is an expanded view of the step of adjusting the name identifier for the target language. There are various steps in the previous drawings that reference this process including: adjusting the class name identifier 472; adjusting the method name identifier 510; and adjusting the package name identifier 518. In this process, an identifier name is generally parsed into name segments, which are individually and independently adjusted for the target language so that the adjusted name is universal. This provides the benefit of allowing individual classes to be translated as modified without requiring retranslation of all related source code files in the entire project. It also facilitates automation because no human interaction is necessary to determine or specify named aliases.

An identifier name in the original computer language 526 is parsed into name segments 528. The system then iterates through the name segments 530 and further parses the identifier name segment in the original computer language 532. It is then determined if the name segment is a keyword in the target language 534. If the name segment is determined to be a keyword in the target language, the system will proceed to append an underscore ("_") to the name segment 536 and proceeds to the next name segment 538. If however, the name segment is determined to not be a keyword in the target language, the system proceeds to determine if the name segment terminates or ends with an underscore ("_") 540. If so, the system proceeds to append an underscore ("_") to the name segment 542 and proceeds to the next name segment 538. If however, it is determined that the name segment does not terminate with an underscore ("_"), the system proceeds to determine whether the name segment ends with a selected character, such as for instance, with an uppercase "R" 544. If not, the system proceeds to the next name segment 538. If however, it is determined that the name segment ends with a selected character, an underscore ("_") is inserted before the last character in the identifier name 546, after which the system proceeds to the next name segment 538.

Figure 13:
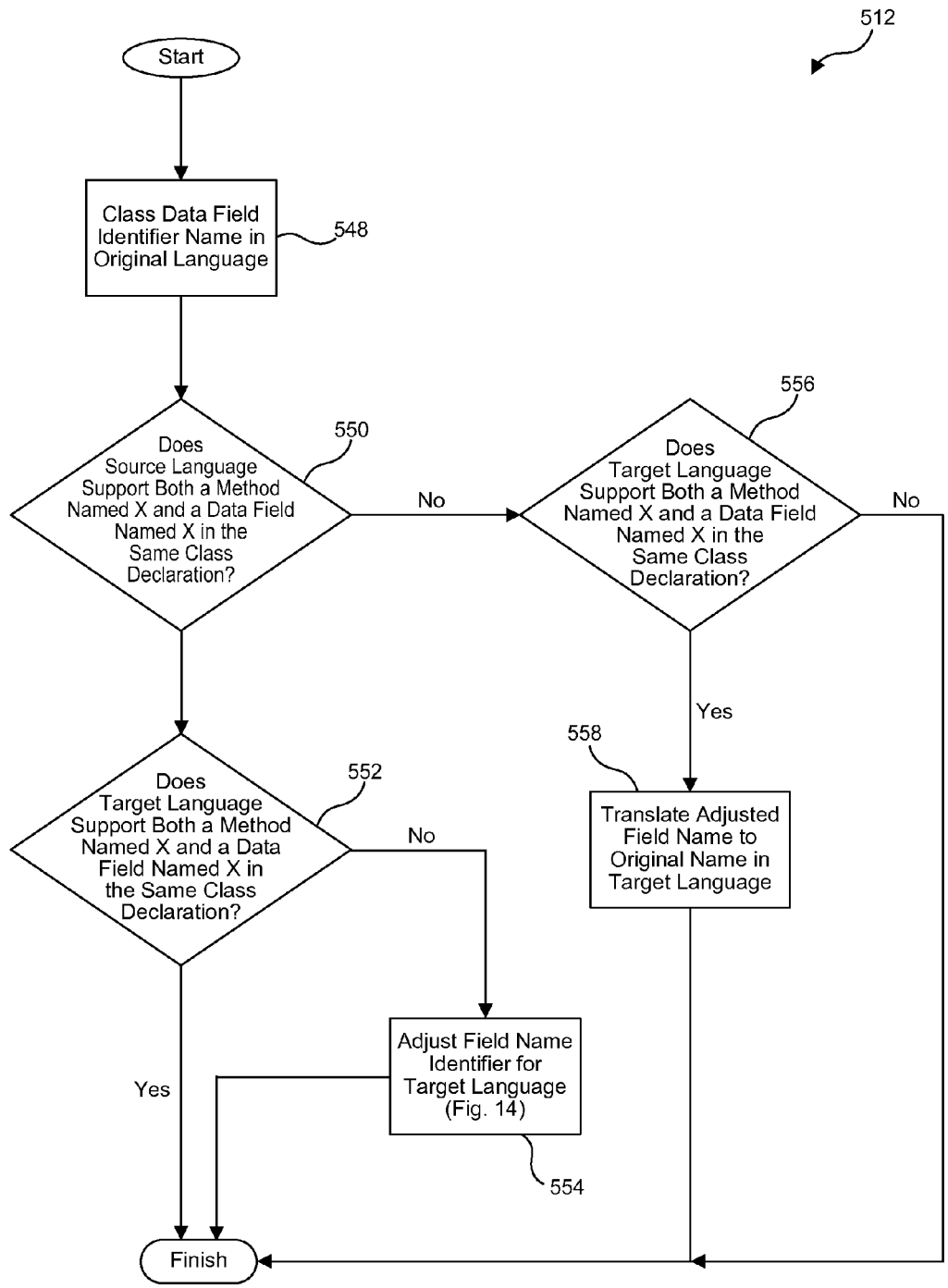
FIG. 13 is a flow diagram according to FIG. 11 illustrating another advantageous embodiment of the present invention.

FIG. 13 is an expanded view of the step of adjusting the data field name identifier for the target language 512. FIG. 13 generally describes the process of resolving conflicting syntactical rules between the original computer language and the target computer language. This process is a demonstration of one advantageous embodiment of the present invention providing an example of translating a class data field identifier name in a source language, such as Java, to a target language, such as C++. It should however be noted that this is merely an example specific to the computer languages used in the example and is equally applicable to any number of various computer languages.

This process begins with a class data field identifier name in the original computer language 548. It is then determined whether the source language supports both a method named "X" and a data field named "X" in the same class declaration 550. If so, the system proceeds to determine if the target language supports both a method named "X" and a data field named "X" in the same class declaration 552. If so, this process is completed. If not however, the field name identifier for the target language is adjusted 554, which is discussed in greater detail in connection with FIG. 14, after which the process is completed. Returning now to determining whether the source language supports both a method named "X" and a data field named "X" in the same class declaration 550, if not, then the system determines if the target language supports both a method named "X" and a data field named "X" in the same class declaration 556. If not, the process is completed. If however it does support both a method named "X" and a data field named "X" in the same class declaration, then the system translates the adjusted field name to the original name in the target language 558, after which the process is completed.

Figure 14:
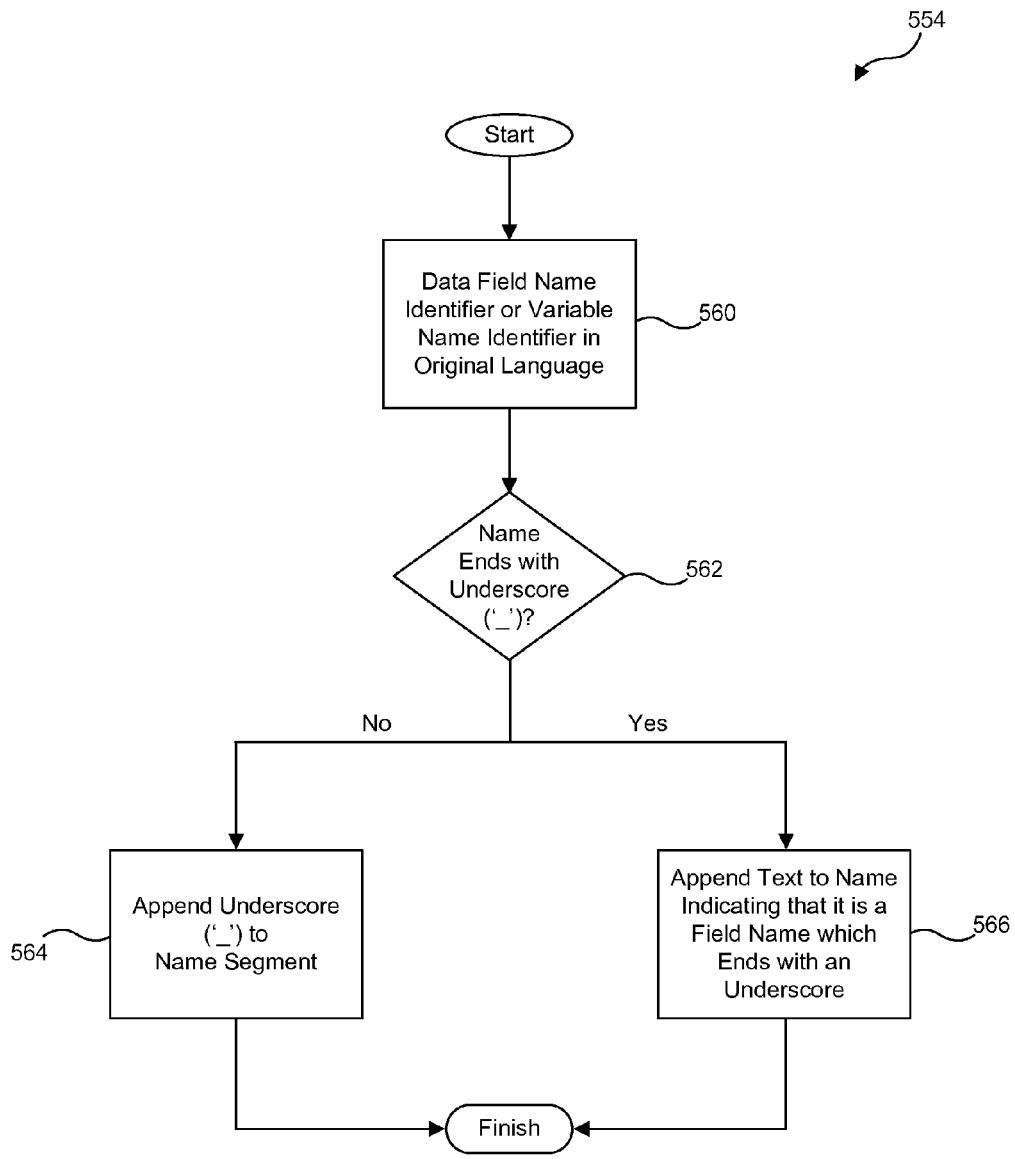
FIG. 14 is a flow diagram according to FIG. 13 illustrating another advantageous embodiment of the present invention.

FIG. 14 is an expanded view of the step of adjusting the field name identifier for the target language 554. FIG. 14 starts with a data field name identifier or variable name identifier in the original language 560. It is then determined if the name ends with an underscore ("_") 562. If not, the system proceeds to append an underscore ("_") to the name segment 564. If however, it is determined that the name ends with an underscore ("_"), the system proceeds to append the text to a name indicating that it is a field name which ends with an underscore 566.

Figure 15:
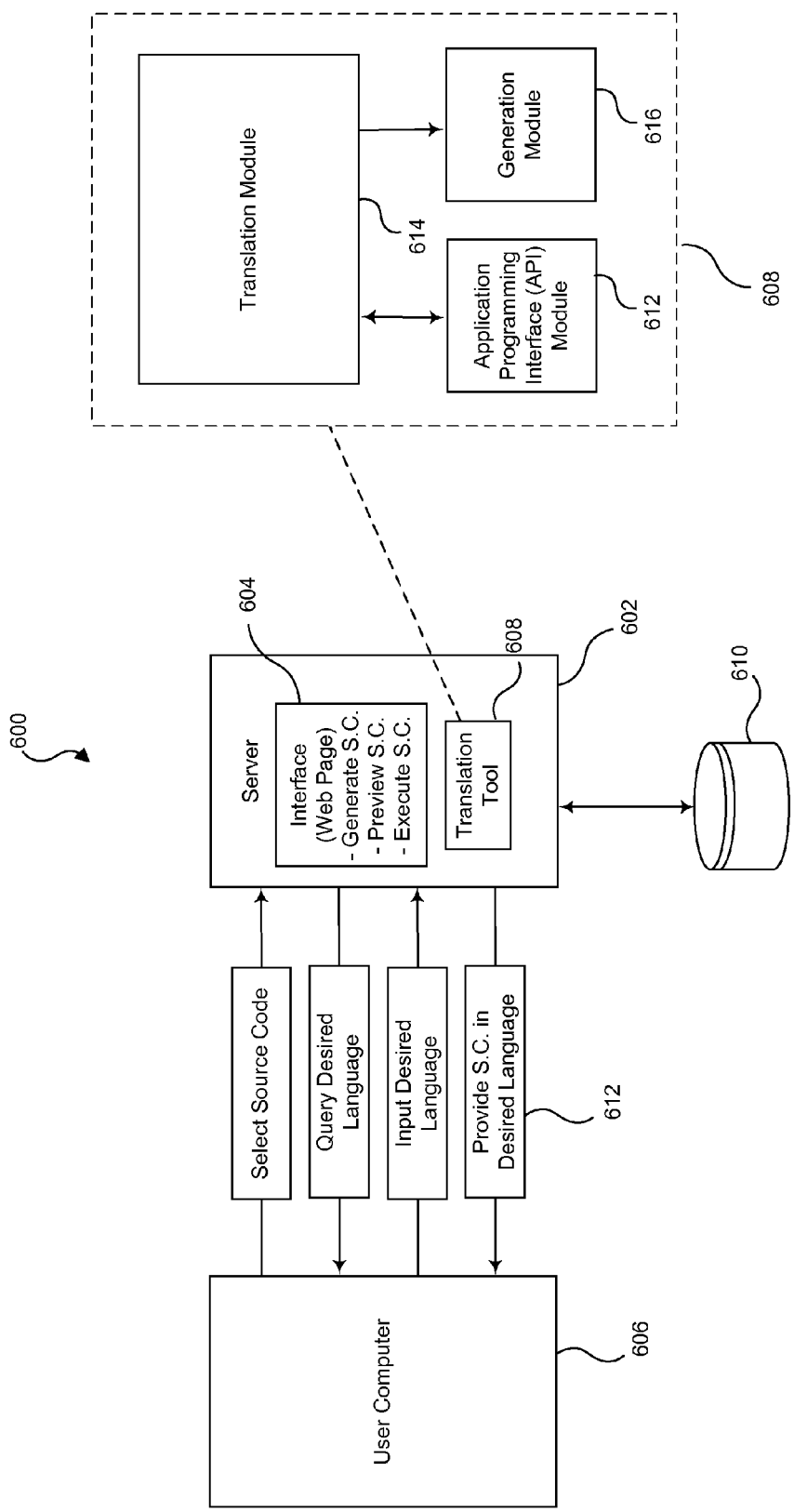
FIG. 15 is a block diagram according to FIG. 1 illustrating an advantageous embodiment of the present invention.

FIG. 15 is a block diagram depicting a translation tool 600 that may be, for example, web-based. A server 602 is depicted presenting an interface 604 that is accessible by a user via a user computer 606 over a network connection (e.g., the Internet). The interface 604 allows the user to browse through various open source code providing various functionality as is known in the art. Once the user identifies the source code providing the functionality desired, the user can then select the identified source code. The user is then presented with an option via the interface 604 prompting the user to select (or enter) the OOP language the user wants the selected source code to be presented in. Once the user's input is received, the translation tool 608 proceeds with the translation process to provide the source code in the desired OOP language.

It is contemplated that the source code may reside on a storage 610 and be saved as a first OOP language (e.g., C++), however, the user would like to receive the source code in a second OOP language (e.g., Java). In this case, the translation tool would retrieve the source code in the first OOP language and generated source code in the desired second OOP language 612.

While the translation tool 608 is illustrated as residing on the server 602, it is contemplated that the translation tool 608 may reside on a second server (not shown) hosted as a different web site from interface 604. In this instance, the user could, via interface 604, select the desired source code in the first OOP language, download the selected source code to the user computer 606, navigate to the web page hosting the translation tool 608, and then upload the first OOP language for translation to a second desired OOP language. Alternatively, instead of the user having to download and then upload the first OOP language, it is contemplated that the interface 604 could push the first OOP language to the web site hosting the translation tool 608 for translation via a user account.

Still further, the user, once translation tool 608 generates the source code in the second OOP language, could be presented with a preview of the individual translated files via interface 604. The user could also execute the source code in the second OOP language via interface 604 allowing the user to view and/or evaluate the functionality of the translated source code prior to downloading or receiving the second OOP language source code.

FIG. 15 is a block diagram showing the translation tool 608 in greater detail, which is illustrated including a Application Programming Interface (API) Module 612, a Translation Module 614 and a Generation Module 616. The translation tool 608 functions essentially in the same manner as previously described and therefore, will not be re-described here. Likewise, the function of the various modules have also been previously described (e.g., the API library has been described, as has the software for analyzing of first source code function and selecting corresponding second source code (Translation Module) and the generation of the second source code based on the selected second source). It will be understood to one of skill in the art that translation tool 608 comprises software that executes on, in this embodiment, a web-based server, and the various modules illustrated in FIG. 15 also comprise software that perform various functions as previously described.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A computer language translation tool for translating a first Object-Oriented Programming (OOP) computer language source code to a second OOP computer language source code, the system comprising:
   a computer having software executing thereon, the software comprising:
   a translation module;
   an emulated Application Programming Interface (API) library module including a table, said API library having:
      data indicative of types of data manipulations of the first OOP computer language source code;
      second computer language API equivalent functions callable by said second computer language;
   said translation module accessing the table of said API library and correlating the type of data manipulation the first OOP computer language source code performs to second OOP computer language source code;
   a generation module generating second OOP computer language source code based in part upon identified equivalent functions in the second computer language.

2. The tool according to claim 1 wherein the translator is a bi-directional translator.

3. The tool according to claim 2 wherein said translation module accesses said library and correlates the type of data manipulation the second computer language source code performs to first computer language source code.

4. The tool according to claim 3 wherein the correlation from the second computer language to the first computer language is independent of the context in which the second computer language source code is used, said generation module generates re-translated first computer language source code that emulates the type of data manipulation the second computer language source code performs.

5. The tool according to claim 2 wherein the re-translated first computer language source code equates to the first computer language source code in: context, syntax, form of expression and formatting.

6. The tool according to claim 1 wherein said translation module performs a name adjustment when an incompatibility between the first computer language source code and the second computer language source code occurs.

7. The tool according to claim 1 wherein the first computer language source code comprises a class.

8. The tool according to claim 7 wherein the class consists of units selected from the group consisting of: methods, data fields, inner-classes, and combination thereof.

9. The tool according to claim 1 wherein the first computer language source code comprises an identifier.

10. The tool according to claim 9 wherein said translation module performs a name adjustment when an incompatibility between the identifier and the second computer language source code occurs.

11. The tool according to claim 1 wherein said translation module generates a tagged element inserted in the second computer language source code indicative of a type of data manipulation the first computer language source code performs.

12. The tool according to claim 11 wherein the tagged element comprises information selected from the group consisting of: formatting, translation data, and first computer language source code.

13. The tool according to claim 1 wherein the first computer language is Java and the second computer language is C++, C#, or Objective-C.

14. The tool according to claim 1 wherein the first computer language is C# and the second computer language is C++ or Objective-C.

15. The tool according to claim 1 wherein the first or the second computer language is a scripting language.

16. The tool according to claim 15 wherein the scripting language is selected from the group consisting of JavaScript, Ruby, Python, Perl and PHP.

17. The tool according to claim 1 wherein said computer comprises a server, and a user accesses the server via a user computer connected to the server via a network connection.

18. A method for providing source code in a desired Object-Oriented Programming (OOP) computer language, the method comprising the steps of:
   providing a server having a network connection and an interface allowing a user computer to access the sever via the network connection;
   presenting the user with a plurality of source code functionality corresponding to a plurality of files;
   receiving a selection of from the user of a selection of at least one of the plurality of files;
   receiving a desired OOP computer language selection from the user;
   providing a translation tool executing on the server, the translation tool having:
      an emulated Application Programming Interface (API) library including a table, the API library having:
         data indicative of types of data manipulations of the first OOP computer language source code;
         second computer language API equivalent functions callable by said second computer language;
      accessing the table of the API library and correlating the type of data manipulation the first OOP computer language source code performs to second OOP computer language source code; and
      generating second OOP computer language source code based in part upon identified equivalent functions in the second computer language.

19. The method of claim 18 further comprising the step of transmitting a notification to the user when the second OOP computer language source code is generated.

20. The method of claim 19 wherein the notification includes the generated second OOP computer language source code.

21. The method of claim 19 wherein the notification includes a link directing the user to a location where the user may download the generated second OOP computer language source code.

22. The method of claim 19 further comprising the steps of:
   receiving a preview request from the user; and
   presenting a preview of the second OOP computer language source code to the user.

23. The method of claim 19 further comprising the steps of:
receiving a program execution request from the user; and
executing the second OOP computer language source code on the server.

* * * * *